United States Patent [19]
Yoshino

[11] Patent Number: 6,037,535
[45] Date of Patent: *Mar. 14, 2000

[54] SUNLIGHT COLLECTION APPARATUS

[76] Inventor: Kazuo Yoshino, 6-1-25 Kasahiwa-cho, Shiki-shi, Saitama-ken, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/680,615

[22] Filed: Jul. 16, 1996

[51] Int. Cl.[7] .......................... H01L 31/052; H01L 31/058
[52] U.S. Cl. .......................... 136/246; 136/248; 126/605; 126/623; 126/699; 126/700; 359/591; 359/599; 385/900
[58] Field of Search ...................................... 136/246, 248; 126/605, 623, 698–700; 359/591–599; 385/900, 33

[56] References Cited

U.S. PATENT DOCUMENTS

| | | | |
|---|---|---|---|
| 3,780,722 | 12/1973 | Swet | 126/680 |
| 4,511,755 | 4/1985 | Mori | 136/246 |
| 4,529,830 | 7/1985 | Daniel | 136/246 |
| 4,541,415 | 9/1985 | Mori | 126/440 |
| 4,653,472 | 3/1987 | Mori | 126/683 |
| 4,717,227 | 1/1988 | Mori | 350/96.1 |
| 4,798,444 | 1/1989 | McLean | 385/76 |
| 5,501,743 | 3/1996 | Cherney | 136/248 |
| 5,581,447 | 12/1996 | Raasakka | 362/32 |
| 5,600,124 | 2/1997 | Berger | 250/203.4 |

FOREIGN PATENT DOCUMENTS

| | | | |
|---|---|---|---|
| 58-136003 | 8/1983 | Japan . | |
| 59-58406 | 4/1984 | Japan . | |
| 59-58408 | 4/1984 | Japan | 385/900 |
| 60-227304 | 11/1985 | Japan . | |
| 61-31836 | 2/1986 | Japan | 136/246 |
| 61-231773 | 10/1986 | Japan | 136/246 |
| 62-96914 | 5/1987 | Japan . | |
| 1-253105 | 10/1989 | Japan . | |
| 1-302604 | 12/1989 | Japan . | |
| 2-139801 | 5/1990 | Japan . | |
| 4-188101 | 7/1992 | Japan . | |
| 6-82606 | 3/1994 | Japan . | |

*Primary Examiner*—Bernard Codd
*Attorney, Agent, or Firm*—Pillsbury Madison & Sutro LLP

[57] ABSTRACT

The present invention relates to a sunlight collection apparatus with increased sunlight gathering and receiving capabilities, which is cheap to produce and allows reliable collection of sunlight without having to track the sun. This sunlight collection apparatus has a light collection portion, facing toward the sun, for collecting sunlight; a light conducting portion, having optical fiber cables, for conducting sunlight collected by said light collection portion indoors; and a light scattering portion, provided at a tip of said light conducting portion, for lighting a room with sunlight conducted by said light conducting portion. The light collection portion has a plurality of lens elements arranged facing in the direction of the sun, with the front surface of each lens element which faces toward the sun having a curved surface. The lens elements have a tapered shape in a rearward direction from the front surface. A guide portion for guiding sunlight entering into the lens element is built into each lens element. This guide portion is coupled with an optical fiber cable from the light conducting portion.

21 Claims, 20 Drawing Sheets

SUNLIGHT COLLECTION APPARATUS

BACKGROUND OF THE INVENTION

1. Technical Field of the Invention

The present invention relates to a sunlight collection apparatus for gathering sunlight from outdoors and guiding the sunlight by means of optical fiber cables to shine inside greenhouses for plant cultivation or inside residences.

2. Related Art

In recent years, various types of sunlight collection apparatuses for gathering sunlight, i.e. natural light, and guiding the light to shine inside greenhouses for plant cultivation or inside residences. This type of sunlight collection apparatus usually comprises a light condenser section for gathering sunlight from outdoors to a single area, a light conducting section for guiding the sunlight gathered at the light collection section, and a light scattering section for irregularly reflecting the sunlight guided by the light conducting section indoors. Conventional sunlight collection apparatuses can be largely divided into (1) types which use ducts as the light conducting means and (2) types which use optical fiber cables as the light conducting means.

Sunlight collection apparatuses which use ducts for the light conducting section as in type (1) mentioned above have a structure wherein sunlight is received at the entrance portion of a duct by means of reflection, the received sunlight is guided to the required room by reflecting the light along the duct, and the room is lit by the sunlight by means of irregular reflection at the light scattering section.

Sunlight collection apparatuses which use optical fiber cables for the light conducting section as in type (2) mentioned above have a structure wherein a lens element having a solar tracking device focuses sunlight at the focal point of the lens element while tracking the sun, the sunlight is guided to the required room through an optical fiber cable having one end surface positioned at the focal point of the lens element, and the room is lit by the sunlight by means of a light scattering material provided at the other end of the optical fiber cable.

However, the above-mentioned conventional sunlight collection apparatuses have the following problems. With regard to type (1), the installation work can be complicated because the light conducting section is formed from ducts, so that a portion of the building must be destroyed in order to install the apparatus in a building which is already standing, thus greatly increasing the cost and inflating the price of installation.

With regard to type (2), the light conducting section is able to be easily installed in buildings because the light conducting section is formed from optical fiber cables, but the light collection section has a large lens element and a tracking device for tracking the sun, so that the support structures for holding the lens element and the tracking device must be complicated, thereby greatly increasing the cost and making the price too high for general purposes.

Additionally, with regard those types which track the sun, the structure must be such as to position the end surface of the optical fiber cable of the light conducting section at the focal point of a large-diameter lens element and continually track the sun in order to maintain the sun on the optical axis of the lens element so that the sunlight can be gathered and received at the focal point on the end surface of the optical fiber cable. Therefore, the tracking device is extremely costly and requires extreme precision to track the sun.

SUMMARY OF THE INVENTION

The present invention has the object of offering a sunlight collection apparatus, with superior sunlight gathering and receiving capabilities, which can gather sunlight without tracking the sun, wherein the light collection section and the light conducting section are easily installed and are capable of gathering sunlight even with rough precision when tracking the sun, and is cheap to build.

In order to resolve the above-mentioned problems, the present invention offers a sunlight collection apparatus, comprising a light collection portion, facing toward the sun, for collecting sunlight; a light conducting portion, having optical fiber cables, for conducting sunlight collected by said light collection portion indoors; and a light scattering portion, provided at a tip of said light conducting portion, for lighting a room with sunlight conducted by said light conducting portion. The light collection portion comprises a plurality of lens elements arranged so as to face toward the sun, a front surface of each lens element facing the sun is curved, each lens element is tapered from said front surface toward a rearward direction, a guide portion for guiding sunlight entering each lens element is built into said lens element, and an optical fiber cable of said light conducting portion is coupled to said guide portion.

According to the sunlight collection apparatus of the present invention, the front surface of each lens element in the light collection section functions as a powerful lens when sunlight hits the front surface of the lens element, so that each lens element is able to gather sunlight from a wide range of angles. The sunlight which enters through the front surface of each lens element reflects off the circumferential surface of the guide portion built into the lens element so as to be led to the rear end of the guide portion, then the light is conducted from the rear end of the guide portion to the core of an optical fiber cable from the light conducting portion. The light which has been guided into the core of the optical fiber cable is scattered by a light scattering portion connected to the end of the optical fiber cable so as to illuminate the room of a building.

PREFERRED EMBODIMENTS OF THE INVENTION

Hereinbelow, the preferred first embodiment of the present invention will be explained with reference to the drawings.

Figure 1:
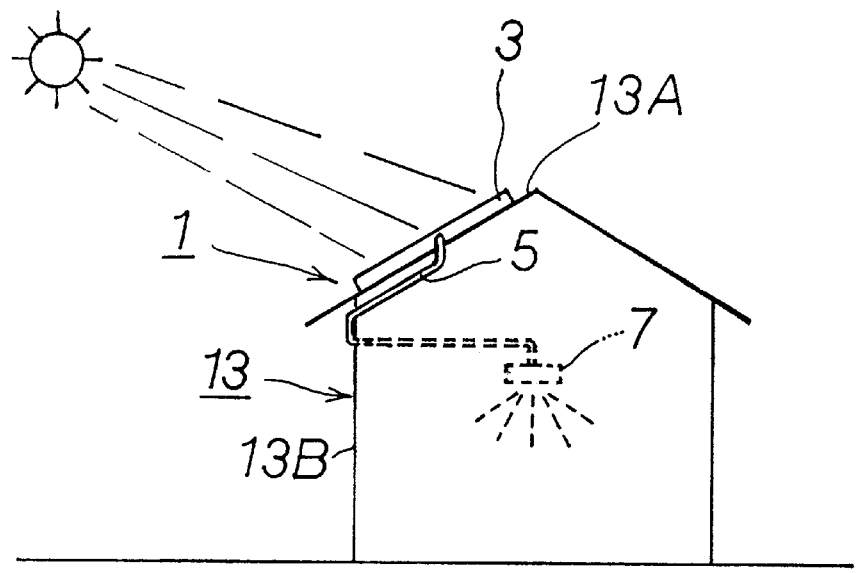
FIG. 1 is a schematic illustration showing the first embodiment of the sunlight collection apparatus according to the present invention.

As shown in FIG. 1, the sunlight collection apparatus 1 comprises a light collection section 3 for gathering sunlight, a light conducting section 5 for guiding the sunlight gathered at the light collection section 3, and a light scattering section 7 for shining the sunlight guided by the light conducting section 5 indoors.

Figure 2:
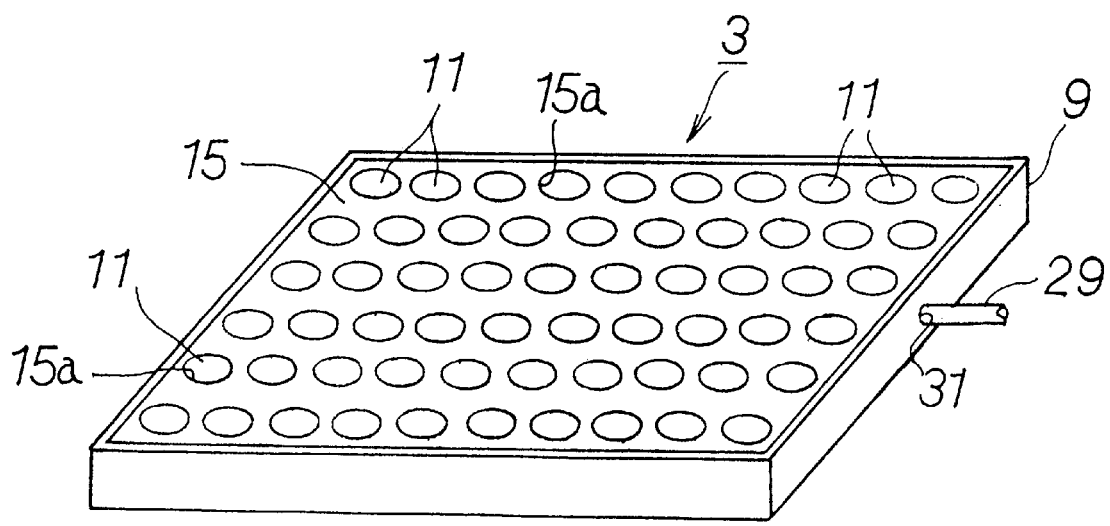
FIG. 2 is a perspective view showing the light collection section of the sunlight collection apparatus.
Figure 3:
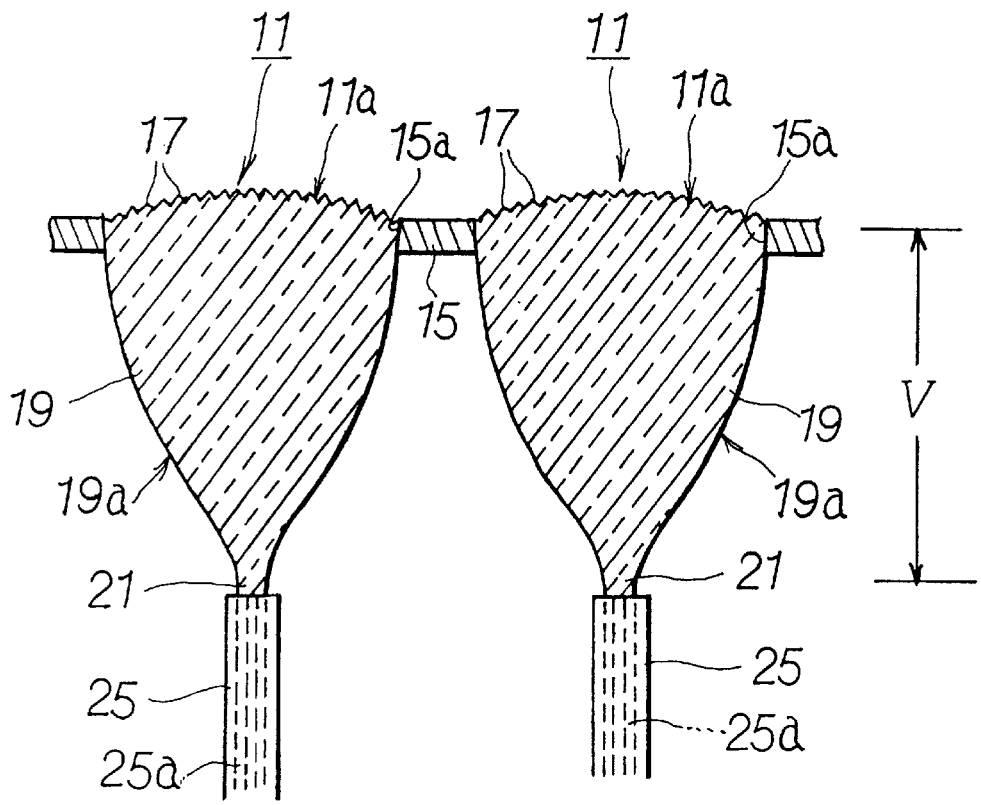
FIG. 3 is a vertical section view showing a lens element.

As shown in FIG. 2, the light collection section 3 has a rectangular case 9 having a designated depth. A plurality of lens elements 11 formed into small-diameter circles with the front surfaces 11a (FIG. 3) acing the sun are arranged inside the case 9 toward the upper portion of the case 9, which can, for example, be installed at a designated angle of inclination facing southwards on a rooftop 13A of a building 13. The case 9 is a thin box with an open upper portion, to the top of which a support panel 15 has been affixed as shown in FIG. 3. Support holes 15a into which the lens elements 11 can fit are formed on this support panel 15. The support holes 15a are provided at positions of arrangement of the lens elements 11, and the lens elements 11 are affixed to the support panel 15 by fitting the lens elements 11 into these support holes 15a.

Figure 4:
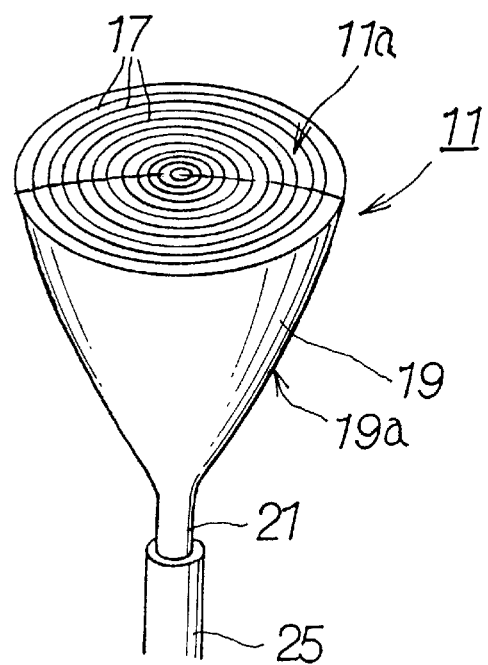
FIG. 4 is a perspective view showing a lens element.

Each lens element 11 may, for example, be formed from glass or plastic materials with the front surfaces of circular form with small diameters of less than approximately 10 cm. As shown in FIGS. 3 and 4, the vertical cross-section of each lens is such that the front surface 11a of the element 11 is formed into a spherical surface which protrudes outward. Fresnel rings 17, having diameters which gradually become larger from the center to the periphery, are formed on this spherical surface 11a, so that the front portion of the lens element 11 forms a Fresnel lens. In the present embodiment, the guide portion 19 and the connection section 21 are formed so that the focal point of this type of lens element 11 is positioned inside the connection section 21 formed unitarily with the guide portion 19 of a solid material. The front surface 11a of the lens element 11 is not restricted to being spherical, and may be a curved surface having any radius of curvature. Consequently, the light gathering capability of the lens element 11 increases and the focal length of the lens element 11 shortens because the front surface 11a of the lens element 11 protrudes outward and Fresnel rings 17 are provided on the front surface 11a, so that the depth dimension V of the guide portion 19 in the lens element 11 can be made smaller than usual.

The rear portion of each lens element 11 is unitarily formed into a guide portion 19 which guides the light entering from the front surface 11a of the lens member 11, and a connection portion 21 is unitarily formed on the guide portion 19. That is, as shown in FIG. 3, the guide portion 19 of the lens member 11 are formed into approximate conical surfaces which are tapered in the direction toward the rear portion of the lens element 11 from the front surface 11a, and the circumferential surface 19a is formed into a convex curved surface which protrudes outward from the front surface 11a to the rear end.

A reflective material (not shown in the drawings) is coated onto the circumferential surface 19a of the guide portion 19 and the connection portion 21 so that the inner surface becomes a mirror surface and the sunlight entering the guide portion 19 is not able to pass through. The circumferential surface 19a of the guide portion 19 is formed with a convex curved surface which bulges outward as mentioned above so that the light entering into the lens element 11 from the front surface 11a of the lens element 11 will not escape through the front surface 11a of the lens element 11 due to the reflective angles for reflecting the sunlight off the inner surface of the guide portion 19 in the lens element 11 being small. In this way, as much as possible of the light entering the front surface 11a of the lens element 11 is captured by the optical fiber cable 25 of the light conducting section 5, thereby increasing the receiving capabilities.

The rear end of the guide portion 19 of the lens element 11 has a designated diameter; that is, the outer diameter is made equal to the diameter of the core 25a of an optical fiber cable 25 having a bundle of a plurality of optical fibers, and the cylindrical connection section 21 is formed unitarily with the guide portion 21. One end surface of the core 25a of the optical fiber cable 25 having a bundle of a plurality of optical fibers is connected to the connection portion 21 of the guide portion 19. As for the method of connecting the connection portion 21 of the guide portion 19 with the end surface of the core 25a of the optical fiber 25, the connection can be made by using a conventional optical fiber connector (not shown in the drawings). The connection can also by made by fusing the end surface of the connection portion 21 of the guide portion 19 with the end surface of the core 25a of the optical fiber cable 25.

Figure 5:
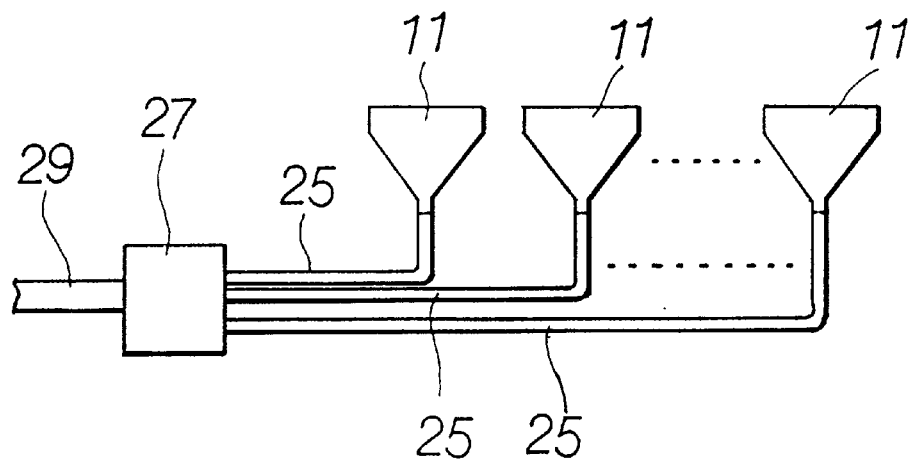
FIG. 5 is a schematic illustration showing the connection structure of optical fiber cables with a main optical fiber cable.

As shown in FIG. 5, each optical fiber cable 25 coupled to the guide portion 19 of a lens element 11 is connected to a main optical fiber cable 29 by means of a special connector 27 inside the case 9. This main optical fiber cable 29 is led outside through a through hole 31 provided in the case 9 as shown in FIG. 2.

The main optical fiber cable 29 led out of the case 9 can, for example, be installed along the side wall 13B from the roof 13A of a building 13, and be led to the required room by passing through the side wall 13B, as shown in FIG. 1. Inside the room, a light scattering portion 7, formed from glass or plastic, which scatters and radiates the light, is attached to the other end surface of the core of the main optical fiber 29. Consequently, the sunlight conducted by means of the optical fiber cables 25 and 29 is able to shine and fill the room. The light conducting section 5 is formed from a plurality of optical fiber cables 25 and the main optical fiber cable 29.

Next, the operation of the sunlight collection apparatus according to the above-described structure will be explained. When sunlight hits each lens element 11 in the light collection portion 3 installed at a designated angle of inclination on the southward roof 13A of a building 13, each lens element 11 functions as a strong convex lens due to the shape of the front surface 11a having a bulging curved surface and the formation of a Fresnel lens provided with Fresnel rings on the front surface 11a, so that each lens element 11 is able to gather sunlight from a wide range. The sunlight entering through the front surface 11a of each lens element 11 is collected at the connection portion 21 of the guide portion 19, conducted to the rear end of the guide portion 19 by reflecting off the circumferential surface 19a of the guide portion 19 provided unitarily with the lens element 11, and led from the connection portion 21 formed at the rear end of the guide portion 19 to the core 25a of the optical fiber cable 25.

In this case, the front surface 11a of the lens element 11 has a spherical shape which bulges outwards, and the front surface 11a also has a Fresnel lens, so that the light gathering capability is markedly increased, and it is possible to gather sufficient sunlight even when the height of the sun largely differs between summertime and wintertime, and when the angle of the sun changes between dawn and dusk within a single day. The guide portion 19 of the lens element 11 has an approximately conical surface which tapers in the rearward direction, and the circumferential surface 19a of this guide portion 19 has a curved shape which bulges outward; therefore, the light entering into the lens element 11 from the front surface 11a of the lens element 11 can be reliably conducted to the optical fiber cable even if the sun is not aligned with the optical axis of the lens element 11. Thus, the light receiving capability of the lens element is increased because the light which has entered into the lens element 11 can be largely prevented from escaping back through the front surface 11a of the lens element 11. Additionally, the focal length of the lens element is shortened due to the outwardly bulging spherical shape of the front surface 11a of the lens element 11 and the Fresnel lens formed at the front surface 11a, so that the depth dimension V of the lens element 11 can be made shorter. As a result, the weight of the lens element 11 can be made lighter even if the guide portion 19 is made unitarily with the lens element 11.

The light which has been conducted to the core 25a of the optical fiber cable 25 coupled to the connection portion 21 of the guide portion 19 of each lens element 11 passes through each optical fiber cable 25 and is further conducted to the main optical fiber cable 29 by way of a connector. The light scattering portion 7 connected to the other end of the main optical fiber cable 29 then scatters light inside a room of the building 13.

Therefore, in the present embodiment, the front surface of each lens element has an outwardly bulging curved surface and a Fresnel lens is formed on the curved front surface, so that the light gathering capabilities are largely increased, allowing sufficient sunlight to be collected even if the height of the sun largely differs between summertime and wintertime and allowing light to be reliably collected when the sun is at a low angle such as at dawn or at dusk during a single day. As a result, reliable light collection is possible without using a solar tracking device, thereby allowing cheap construction. Since the guide portion of the lens element has an approximately cylindrical shape which tapers in the rearward direction and the circumferential surface of this guide portion has a curved shape which bulges outwardly, the light entering the lens element from the front surface of the lens element is reliably conducted to the coupled optical fiber cable even if the sun is not aligned with the optical axis of the lens element, so that the light which has entered the lens element is largely prevented from escaping through the front surface of the lens element, thereby increasing the light receiving capability. Since the front surface of the lens element has a curved shape which bulges outwardly and a Fresnel lens is formed on the curved front surface, the focal length of the lens element is made shorter, thereby allowing the depth dimension of the lens element to be made smaller. As a result, the weight of the lens element can be reduced even if the guide portion is formed unitarily with the lens element. Since the light conducting section 5 is formed from optical fiber cables, the installation work is not complicated as with conventional duct-type configurations, so as to allow easy attachment.

Figure 6:
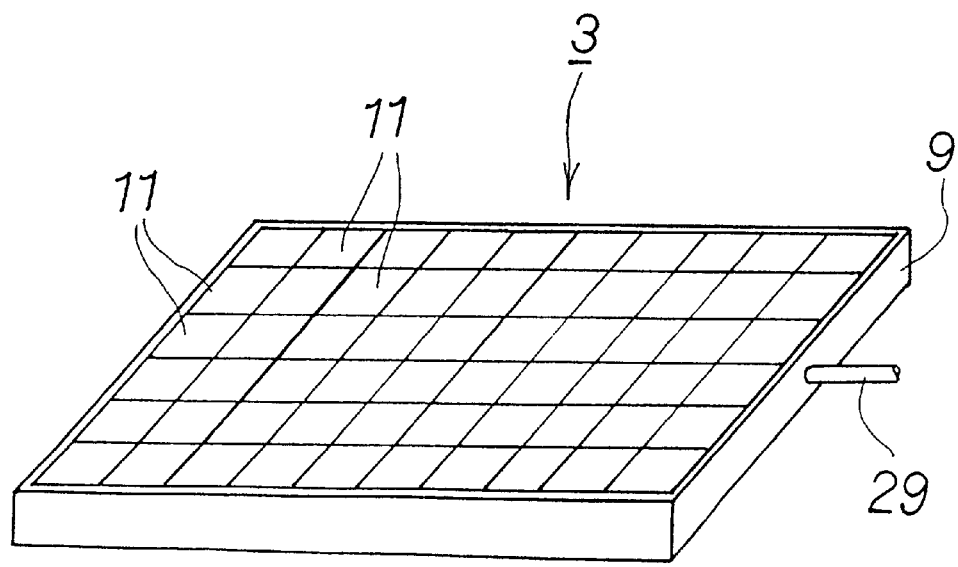
FIG. 6 is a perspective view showing the collection section of the second embodiment of the present invention.
Figure 7:
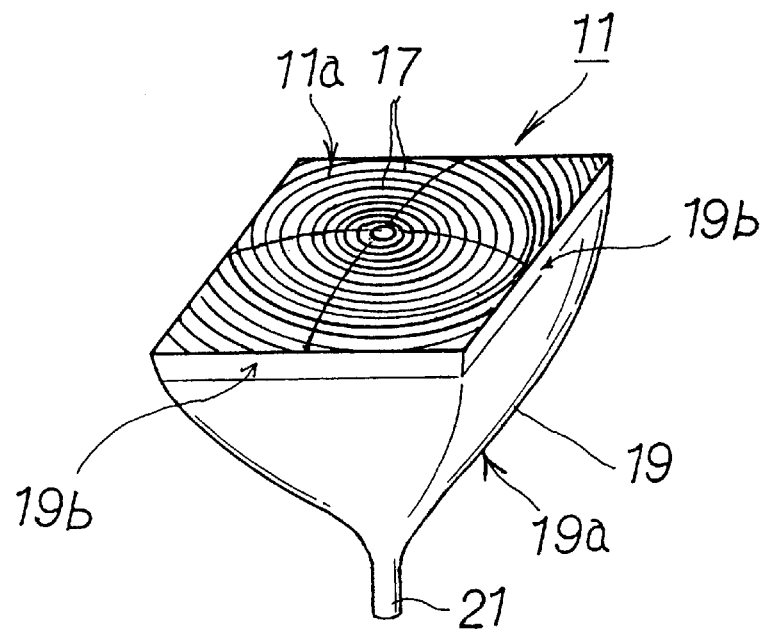
FIG. 7 is a perspective view showing a lens element.

The second embodiment of the light collection section according to the present invention will be explained with reference to the drawings. FIG. 6 is a perspective view showing a light collection section of the present embodiment, and FIG. 7 is a perspective view showing a lens element. In the present embodiment, the light collection section 3' of the sunlight collection apparatus 1 has a different structure. That is, as shown in FIG. 6, the light collection section 3' of the present embodiment has a plurality of lens elements 11' arranged within a rectangular case 9, each lens element 11' having a planar shape wherein the planar surface of the case 9 facing the sun is divided into a plurality of identical shapes. While the front surface of the case has been divided into rectangles in the present embodiment, the shapes are not restricted thereto, so that the surface may be divided into other shapes, such as polygons, triangles or hexagons, and the shape of the front surface of each lens element 11' can be formed into a corresponding planar shape.

Figure 8:
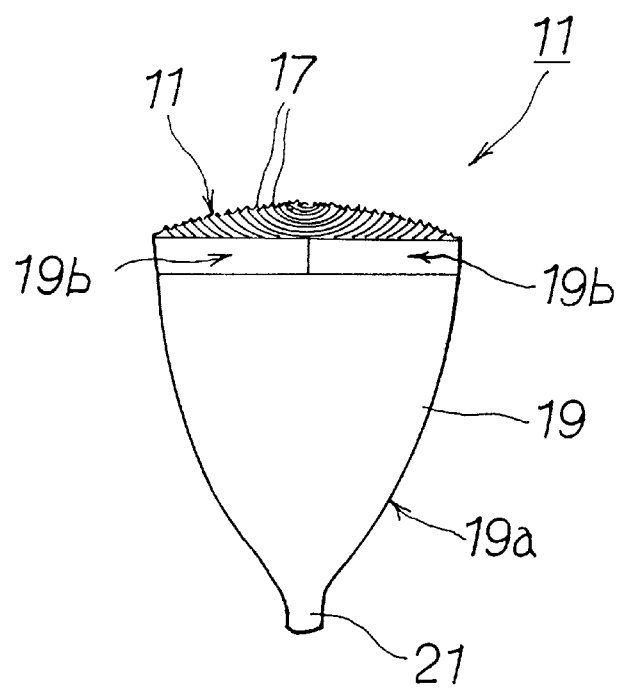
FIG. 8 is a vertical section view showing a lens element.

For example, the planar shape of each lens element 11' can be made square and the lens elements 11' can be arranged in mutually adjacent fashion without gaps, as shown in FIGS. 6 and 7. As shown in FIGS. 7 and 8, each lens element 11' has a front surface facing the sun which bulges outwardly with a spherical shape and has Fresnel rings 17' which become gradually larger from the center to the periphery so as to form a Fresnel lens on the lens element 11', as with the previous embodiment. As shown in FIG. 8, a contact surface portion 19b' corresponding to each side of the planar square is provided around the front portion of the guide portion 19' of each lens element 11' as shown in FIG. 8, so as to allow adjacent lens elements to contact each other. Consequently, it is possible to obtain the same effects as with the previous embodiment, while allowing more sunlight to be collected by filling in the gaps between the lens elements.

Figure 9:
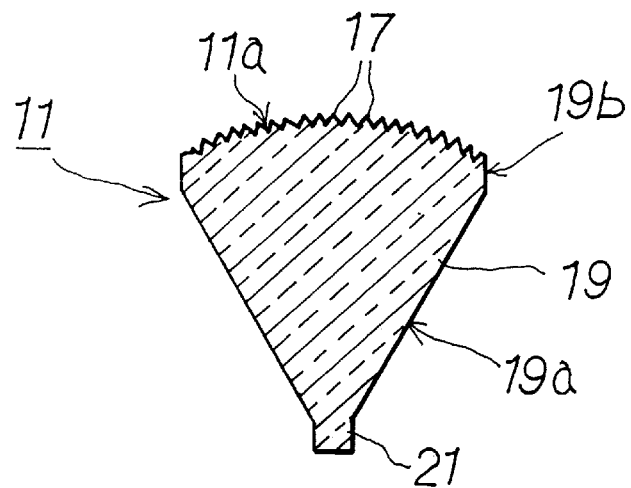
FIG. 9 is a vertical section view showing a modification example of a lens element.
Figure 10:
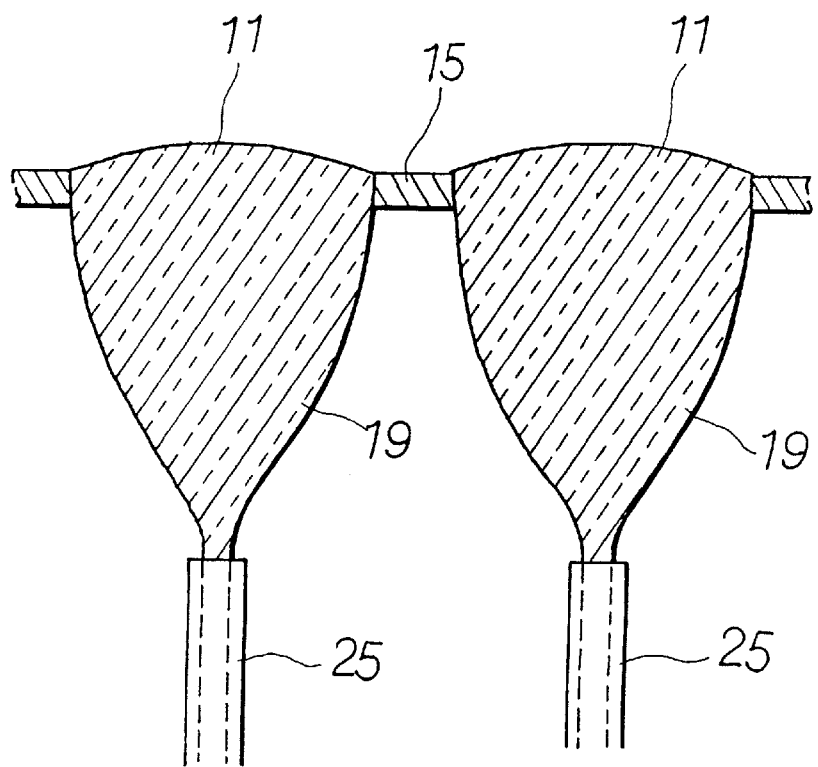
FIG. 10 is a vertical section view showing lens elements with convex front surfaces.
Figure 11:
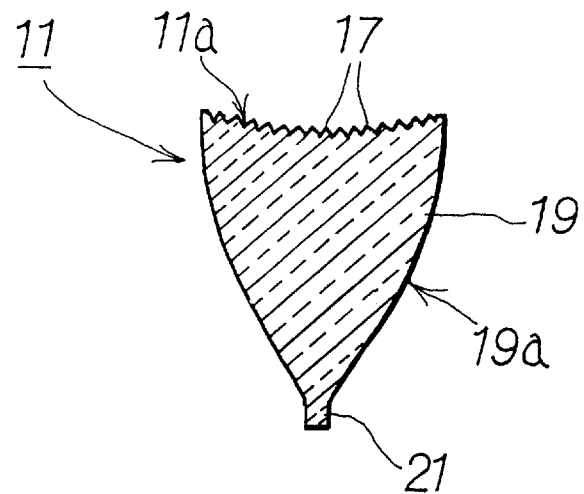
FIG. 11 is a vertical section view showing a lens element with a concave front surface.
Figure 12:
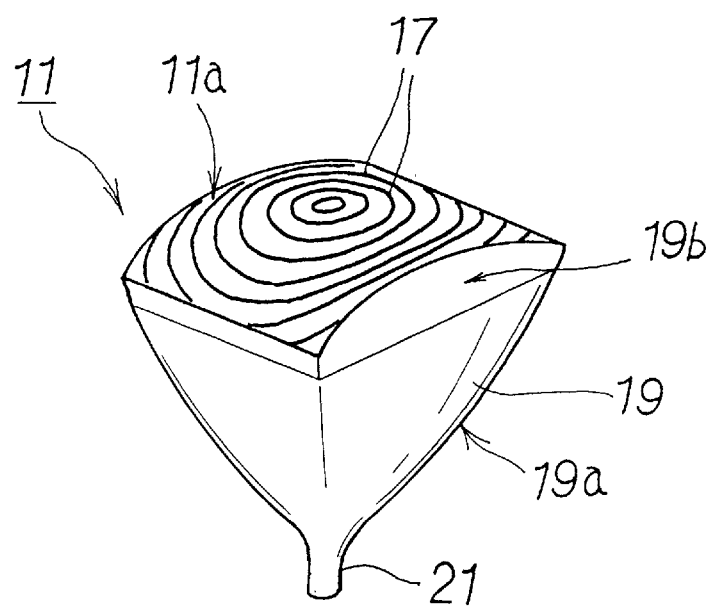
FIG. 12 is a perspective view showing a lens element wherein the front surface is formed into a cylindrical curved surface.
Figure 13:
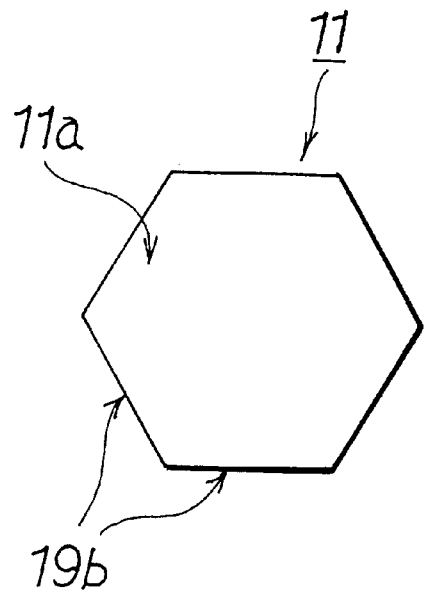
FIG. 13 is a plan view showing a lens element wherein the front surface is hexagonal and Fresnel rings are formed on the front surface.
Figure 14:
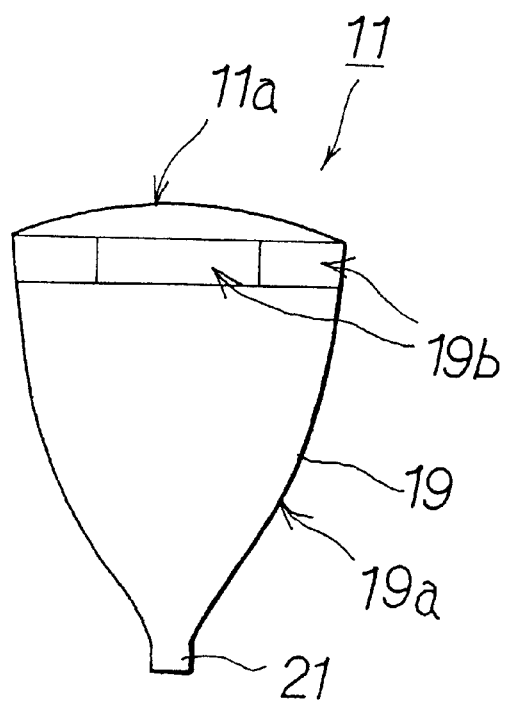
FIG. 14 is a vertical section view of a lens element wherein the front surface is hexagonal and Fresnel rings are formed on the front surface.
Figure 15:
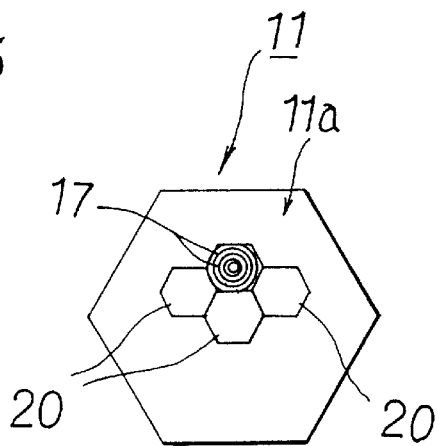
FIG. 15 is a plan view of a lens element wherein the convex front surface is hexagonal and a plurality of hexagonal Fresnel lenses are formed on the front surface.
Figure 16:
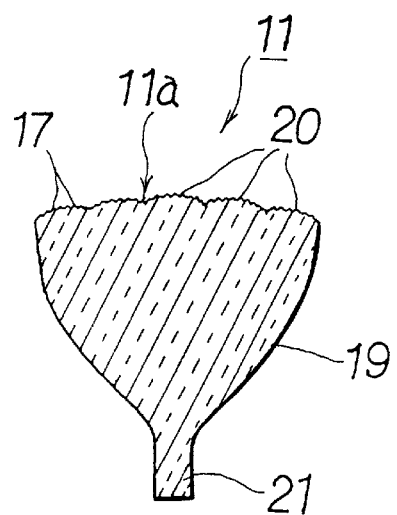
FIG. 16 is a vertical section view of a lens element wherein the convex front surface is hexagonal and a plurality of hexagonal Fresnel lenses are formed on the front surface.

Next, other embodiments of a lens element according to the present invention will be explained with reference to the drawings. FIG. 9 is a vertical section view showing a modification example of a lens element. FIG. 10 is a vertical section view showing lens elements with convex front surfaces. FIG. 11 is a vertical section view showing a lens element with a concave front surface. FIG. 12 is a perspective view showing a lens element wherein the front surface is formed into a cylindrical curved surface. FIG. 13 is a plan view showing a lens element wherein the front surface is hexagonal and Fresnel rings are formed on the front surface. FIG. 14 is a vertical section view of a lens element wherein the front surface is hexagonal and Fresnel rings are formed on the front surface. FIG. 15 is a plan view of a lens element wherein the convex front surface is hexagonal and a plurality of hexagonal Fresnel lenses are formed on the front surface. FIG. 16 is a vertical section view of a lens element wherein the convex front surface is hexagonal and a plurality of hexagonal Fresnel lenses are formed on the front surface.

The vertical cross-sectional shape and the planar shape of the lens elements 11, 11', 11", 11''', 110, 111, 211, 311, 411, and 511 are not restricted to the above examples, and similar effects can be obtained by the following structures.

1) The shape of the circumferential surface 19a''' of the guide portion 19''' of the lens element 11''' can be made purely conical, or the circumferential surface of the guide portion 19''' can be made so as to combine a conical surface with a contact surface portion 19b''' formed at the front portion, as shown in FIG. 9. In these cases, the receiving capability is somewhat reduced, but the resulting effect is similar.

2) As for the shape of the front surface 110a of the lens element 110, it is possible to have an outwardly bulging curved surface without Fresnel rings as shown in FIG. 10, to have an inwardly indented curved surface without Fresnel rings (not shown in the drawings), to have an inwardly indented curved surface having Fresnel rings 117 formed on the front surface 110a as shown in FIG. 11. The planar shapes of these examples are not restricted to being circular, and it is possible to have elliptical or polygonal shapes as well. When the structure is such as to have an inwardly indented curved surface having Fresnel rings 117 formed on the front surface 111a as shown in FIG. 11, the guide portion 119 of the lens element is tapered in a rearward direction and the circumferential surface 119a has a curved shape which bulges outward, so that the angle of reflection of the sunlight entering the guide portion 119 through the front surface 111a of the lens element 111 is made small. As a result, the sunlight is more reliably guided to the connection portion 121, and it becomes possible to reliably gather the light so that the sunlight receiving capability is able to be comparatively increased.

3) While the front surface 11 of the lens element 11 was made into either a convex or concave spherical surface, the surface is not necessarily restricted to being spherical, so that the surface 211a may be a different type of curved surface, for example a cylindrical surface as shown in FIG. 12. That is, the front surface 211a of the lens element 211 may be a cylindrical curved surface, so that it becomes possible to gather as much sunlight as possible even when the sun is at a low angle during the wintertime or when the sun is positioned to the east or west, by orienting the axis of the cylindrical surface vertically or laterally.

4) The planar shape of the lens elements is not necessarily restricted to being round or rectangular as in the above-mentioned embodiments, and may be hexagonal as shown in FIGS. 13 and 14 or FIGS. 15 and 16. The lens element 211 shown in FIGS. 13 and 14 has a planar shape which is hexagonal, wherein the front surface 311a is convex, the front surface 311a has Fresnel rings, and contact surface portions 319b are formed around the front portion of the guide portion 319. These lens elements 311 are capable of being arranged in a honeycomb pattern. The lens element shown in FIGS. 15 and 16 has a hexagonal planar shape, wherein hexagonal curved surfaces 420 and 520 bulge outward from the convex front surface 411a and 511a, and Fresnel rings 417 are formed on each hexagonal curved surface 420. Consequently, similar effects are able to be obtained by the lens element shown in FIGS. 13 and 14, while the lens elements shown in FIGS. 15 and 16 increase the light gathering capabilities by providing a plurality of hexagonal convex surfaces and Fresnel rings on the lens element. Alternatively, the front surface of the lens may be flat or concave instead of being a curved surface which bulges outwardly.

Figure 19:
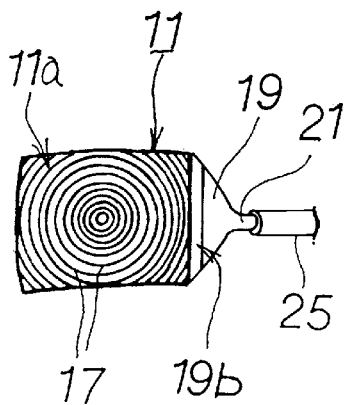
FIG. 19 is a perspective view showing a lens element taken from a portion of the light collection section.
Figure 17:
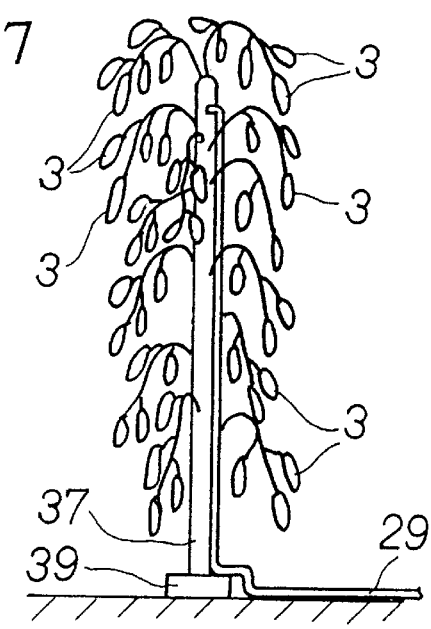
FIG. 17 is a front view showing a tree-type light collection section wherein a plurality of light receiving sections are arranged into a tree shape, according to the third embodiment of the light collection section of the present invention.
Figure 18:
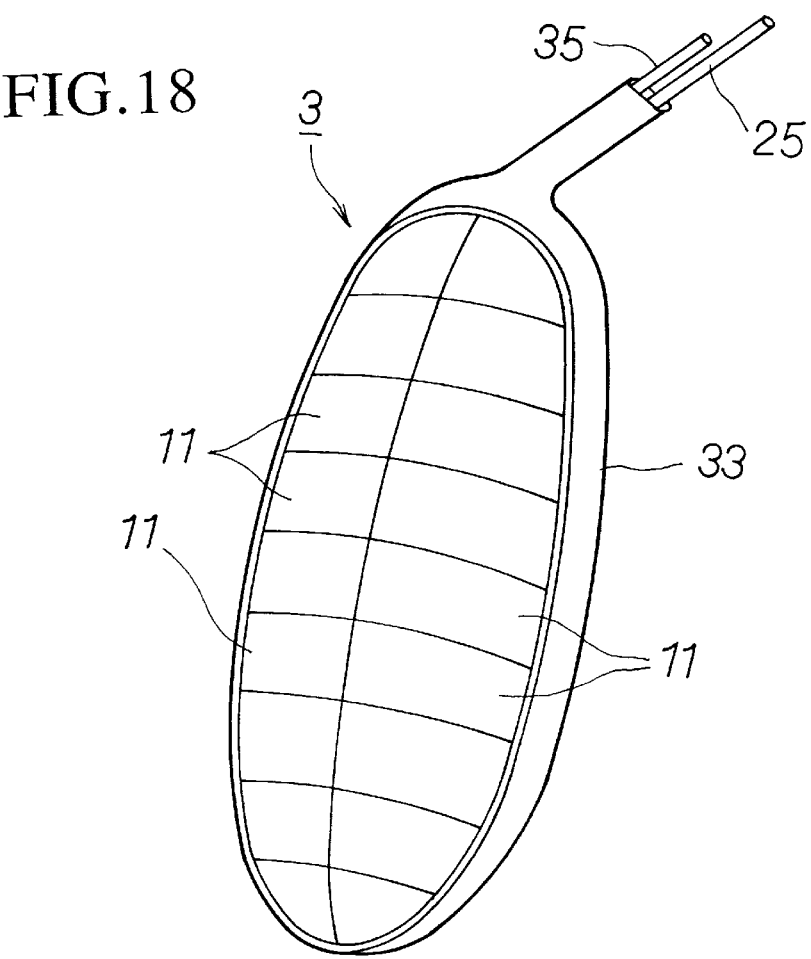
FIG. 18 is a perspective view showing a light collection section.

The third embodiment of the light collection section according to the present invention will be explained with reference to the drawings. FIG. 17 is a front view showing a tree-type light collection section wherein a plurality of light receiving sections are arranged into a tree shape, according to the third embodiment of the light collection section of the present invention. FIG. 18 is a perspective view showing a light collection section. FIG. 19 is a perspective view showing a lens element taken from a portion of the light collection section. According to the present embodiment as shown in FIG. 17, the light collection section 73 of the sunlight collection apparatus 71 has a structure such as to allow installation, not on the roof 13A of a building 13, but in a well-lit location such as a yard. Therefore, it is installed in tree-form wherein a plurality of light collection sections 73 shaped like the leaves of a tree are provided on a pole (support pole) 37. As shown in FIG. 18, each leaf-shaped light collection section 73 is formed from a leaf-shaped case 733, and a plurality of lens elements 711 arranged inside this case 733.

The lens elements 711 arranged inside this case 733 are each formed into planar shapes such as to divide the front surface of the case 733 which faces the sun into a plurality of sections. According to the present embodiment as shown in FIG. 19, each lens element 711 has an approximately rectangular shape, wherein each side of the front portion of the guide portion 719 is provided with a corresponding contact surface portion 719b, so that the lens elements 711 can be arranged inside the case 33 in mutual contact. The front surface 711a of each lens element 711 has an outwardly bulging spherical shape as with the above embodiments, and the front surface 711a is formed into a Fresnel lens having Fresnel rings 717 as shown in FIG. 19. As with the above embodiments, the guide portion 719 formed unitarily with the lens element 711 has a conical surface which tapers in a rearward direction, and the circumferential surface 719a of this guide portion has a curved shape which bulges outwardly.

As with the above embodiments, an end surface of the core 25a of an optical fiber cable 25 is connected to the connection portion 721 provided on the guide portion 719 of each lens element 711, and the plurality of optical fiber cables 725 connected to the connection portions 721 of the lens elements 711 of a single leaf-shaped light collection section 73 are bundled and led outside of the case 733.

A wire (support material) 35 which supports the leaf-shaped light collection section 73 is unitarily attached to the upper portion of the case 733. The bundled optical fiber cables 725 of a single light collection section 73 are supported by the wire by means of tape or the like. As shown in FIG. 18, the wires 35 and optical fiber cables 25 of a plurality of light collection sections 73 are bundled at different locations to mimic the branch of a tree, and the tip portions of the wires 35 of the light collection sections 73 which form a single branch are attached at arbitrary locations on the pole 37. The pole 37 can be formed from a metal or the like, and may be implanted by being supported with a concrete foundation 39 in the ground at a well-lit location such as a yard. The wires 35 of the light collection sections 73 forming the plurality of branches are attached to the pole 37 at different heights and orientations, so as to arrange them in a fashion wherein the plurality of light collection sections 73 mimic the leaves of a tree as shown in FIG. 17. The wires 35 can be attached to the pole 37 in detachable fashion, for example by means of hooks.

The optical fiber cables 725 of the light collection sections 73 of a single branch are inserted into the pole 37 through holes provided near the positions of attachment of the wires 35, then connected to the main optical fiber cable 29 by means of a connector along with the optical fiber cables 725 of the light collection sections 73 of other branches. The main optical fiber cable 29 from the pole 37 follows the ground or the wall of a building to lead to the designated room, and the inside of the room is lit by means of the light scattering portion 7 provided at the tip of the optical fiber cable 29. The number of light collection sections 73 attached to the pole can be any arbitrary number depending upon the size of the room, as long as adequate light is obtained in order to light the room. The lens elements may also be arranged with a plurality provided on both sides of the leaf-shaped case so as to further increase the light collection capability.

Consequently, the sunlight collection apparatus of the present embodiment allows the same effects as the above embodiments to be obtained, while making the installation work easier by allowing ground installation, increasing the light collection efficiency even with a small area of installation due to the plurality of light collection sections hung from the pole, and allows sunlight to be collected without any significant influence based on the change in the angle of the sun over a single day or the height of the sun.

Figure 20:
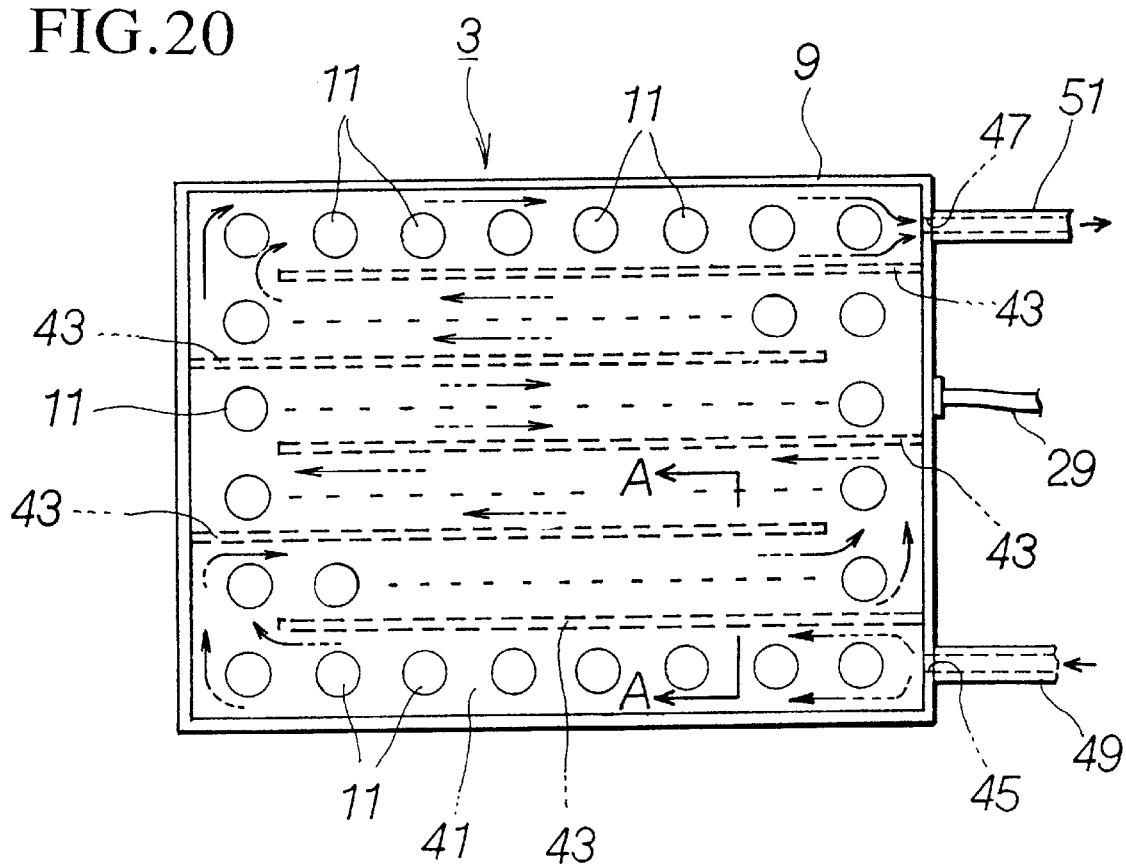
FIG. 20 is a plan view showing a light collection section having a water route according to the fourth embodiment of the present invention.
Figure 21:
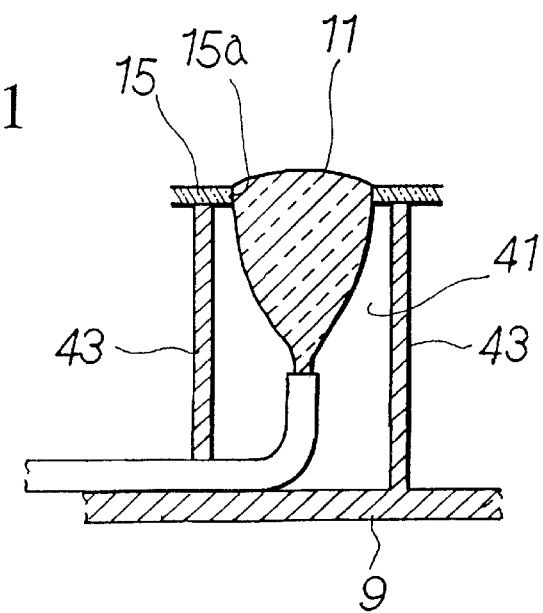
FIG. 21 is a section view along the line 21—21 in FIG. 20 showing the water route.

Next, the fourth embodiment of the light collection section according to the present invention will be explained with reference to the drawings. FIG. 20 is a plan view showing a light collection section having a water route according to the fourth embodiment of the present invention. FIG. 21 is a section view along the line 21—21 in FIG. 20 showing the water route. According the present embodiment, the sunlight collection apparatus 1 has a structure wherein it is combined with a solar water heater. That is, similar to the first embodiment, the sunlight collection apparatus 1 of the present embodiment has a plurality of lens elements 11 arranged inside a rectangular case 9. Each lens element 11 is supported on a support panel 15 affixed to the upper portion of the case 9. In the present embodiment, this support panel 15 is formed from a transparent glass or plastic material. A water route 41 is provided along each row of lens elements 11 arranged laterally inside the case 9, so as to include all of the rows of laterally arranged lens elements by going back and forth from the bottom row to the top row. As shown in FIG. 21, this water route 41 is formed by a plurality of separation panels 43 which protrude from the bottom panel of the case 9 so that their tips contact the support panel 15, between the lateral rows of lens elements 11. The plurality of separation panels 43 are provided with gaps between the required ends of the separation panels 43 and the side walls of the case 9, so that when installed on a slanted roof 13A, water flows in a weaving fashion from the bottom row of lens elements 11 to the top row.

As shown in FIG. 20, the side walls of the case 9 are provided with an open portion 45 which communicates with the bottom row and an open portion 47 which communicates with the top row, and while a cold water pipe 49 for tap water is connected to the open portion 45, a hot water pipe 51 which carries away hot water heated by solar heat is connected to the open portion 47. This hot water pipe leads to a hot water reservoir tank or a hot water faucet in a bathroom.

This type of sunlight collection apparatus 1 is installed on a roof 13A and the lens elements 11 gather sunlight in order to light the required rooms. At the same time, tap water flows through the water route 41 provided below the lens elements 11. This tap water is heated in the water route 41 by solar energy which passes through the transparent support panel 15, and this heated water is supplied to a hot water reservoir tank or a bathroom by way of a hot water pipe 51. Therefore, with the present embodiment, while solar heat is received while the lens elements are collecting sunlight, the water route for tap water formed around the laterally arranged lens elements allows the tap water inside the water route to absorb the solar heat absorbed by the lens elements; thus, the hot water supply capabilities can be increased while simultaneously preventing increases in the temperature of the lens elements. Although the water route 41 was formed by providing separation panels 43 in the present embodiment, the structure is not necessarily restricted to such, and the same effects can be obtained by laying pipes back and forth inside the case 9.

Figure 22:
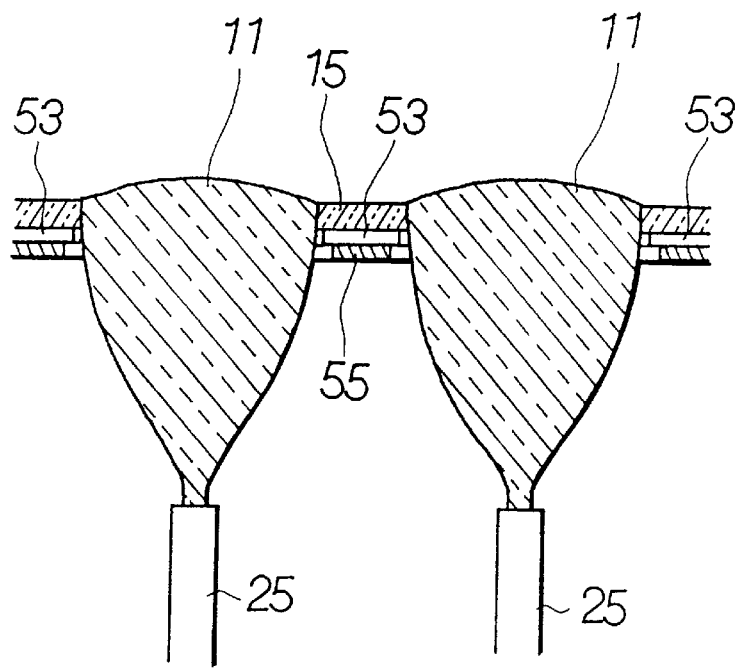
FIG. 22 is a vertical section view showing a light collection section having solar batteries according to the fifth embodiment of the present invention.

The fifth embodiment of the light collection section according to the present invention will be explained with reference to the drawings. FIG. 22 is a vertical section view showing a light collection section equipped with solar cells according to the present embodiment. In the present embodiment, the support panel (support material) 15 of the sunlight collection apparatus 1 is provided with solar cells 53. That is, in the present embodiment as shown in FIG. 22, a plurality of lens elements 11 are provided within the case 9, the support panel for supporting these lens elements 11 is formed from a transparent material, a plurality of solar cells are installed in the spaces between the lens elements 11 of the support panel 15, and the solar cells 53 are supported by means of a separate support panel (support material) 55. Each of the plurality of solar cells 53 is connected to a designated capacitor (not shown in the drawings) by means of electrical wiring, and these capacitors are connected to electrical devices such as light bulbs by way of designated electrical circuitry. As a result, the present-embodiment allows the lens elements to collect sunlight in order to light up the required rooms, while simultaneously charging the solar cells, thereby ensuring efficient use of space oh the roof of the building, which offers an advantage when a lot of sunlight collection apparatuses are installed on the roof.

Figure 23:
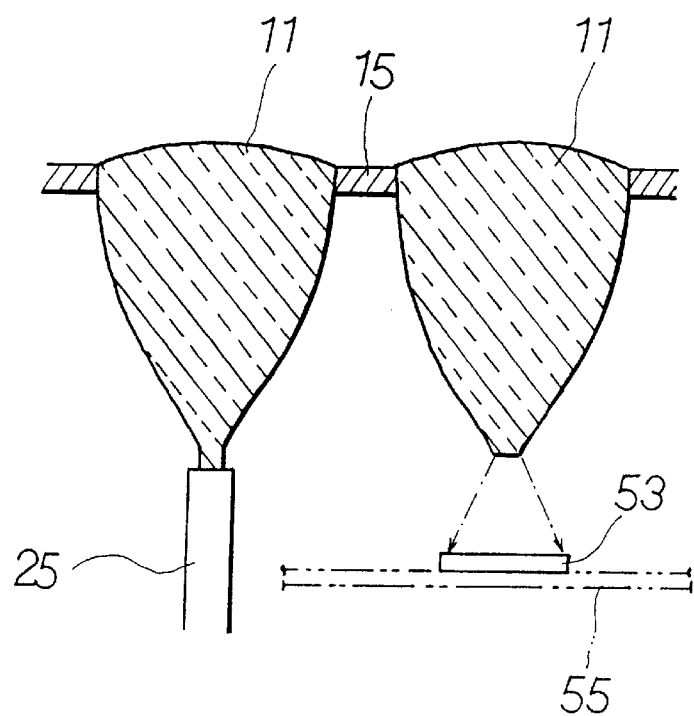
FIG. 23 is a vertical section view showing a light collection section having solar batteries according to the sixth embodiment of the present invention.

Next, the sixth embodiment of the light collection section according to the present invention will be explained with reference to the drawings. FIG. 23 is a vertical section view showing a light collection section having solar cells according to the present embodiment. The present embodiment increases the electricity generation capability of the solar cells 53 by using the light gathering capabilities of the lens elements 11 of the sunlight collection apparatus 1. That is, the present embodiment has a plurality of lens elements 11 similar to those of the first and second embodiments, except that solar cells 53 are installed opposite the end surfaces of the connection portions 21 of some of the lens elements, as shown in FIG. 23. The plurality of solar cells 53 are supported by means of a support panel 55. The lens elements 11 may be selected reciprocatively with the light-gathering lens elements 11. Each solar cell 53 is connected to a designated capacitor (not shown in the drawings) by means of wiring which leads out of the case 9. In the present embodiment, the connection portion 21 of the lens element 11 is removed, and the lens element 11 is formed so that sunlight hits the entire surface of a solar cell having a designated area. As a result, the present embodiment allows solar electricity to be generated by sunlight collected by the lens elements which have exceptional light gathering capabilities, so that the electrical power generating ability of the solar cells increases and the electrical power is able to be reliably used in households. Combining the lens elements with solar cells allows the construction of a solar cell apparatus with increased electrical power generating ability.

Figure 24:
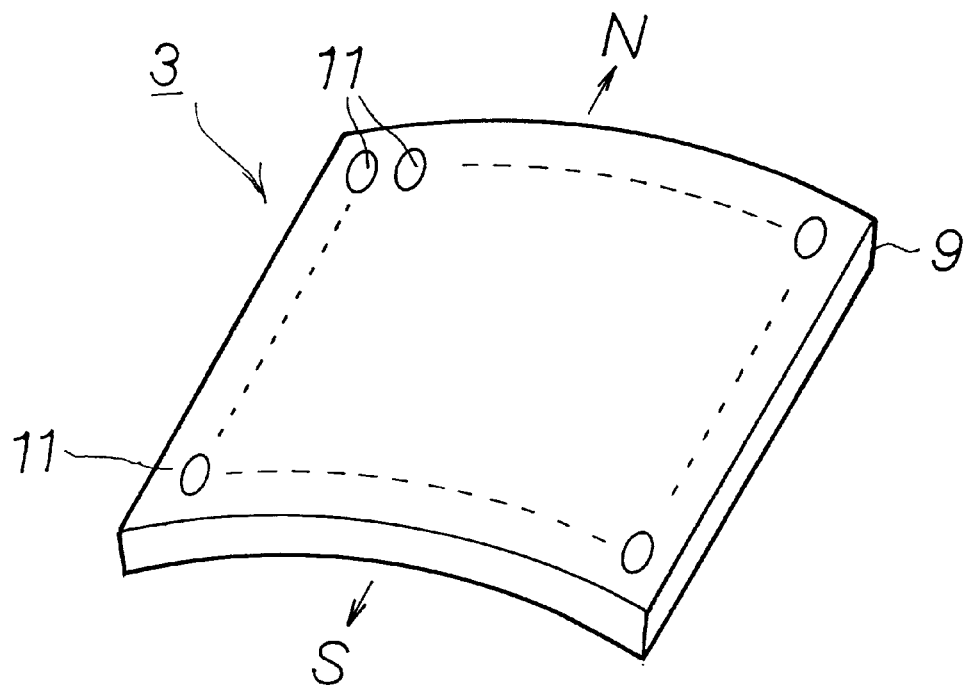
FIG. 24 is a perspective view showing another embodiment for the structure of a lens element of the light collection section, showing a light collection section wherein a plurality of lens elements are arranged laterally across a curved surface which protrudes outward.
Figure 25:
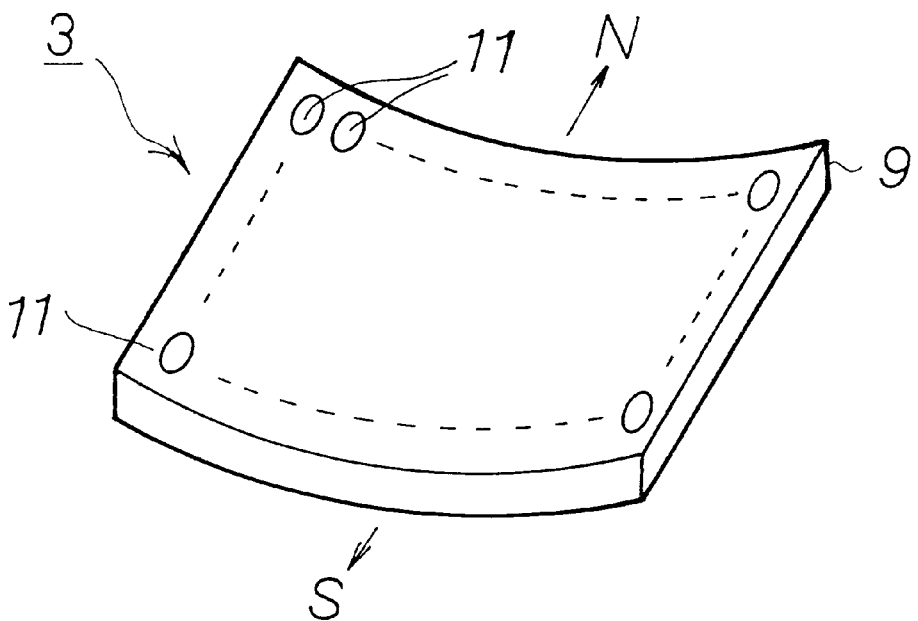
FIG. 25 is a perspective view showing a light collection section wherein a plurality of lens elements are arranged laterally across a curved surface which indents inward.
Figure 26:
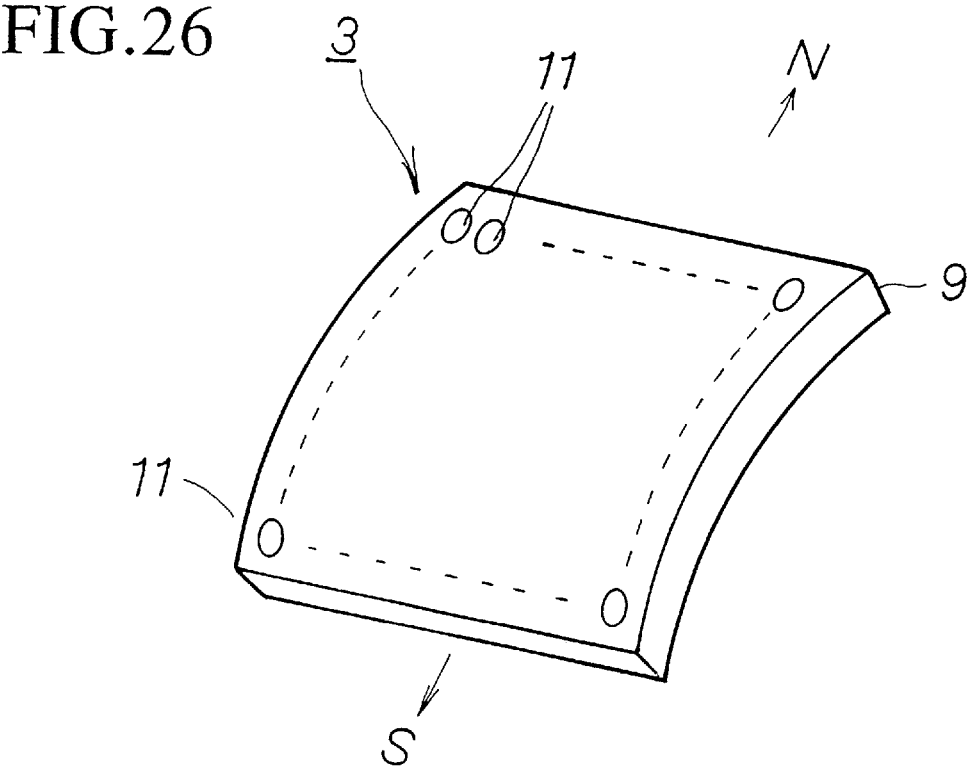
FIG. 26 is a perspective view showing a light collection section wherein a plurality of lens elements are arranged vertically across a curved surface which protrudes outward.
Figure 27:
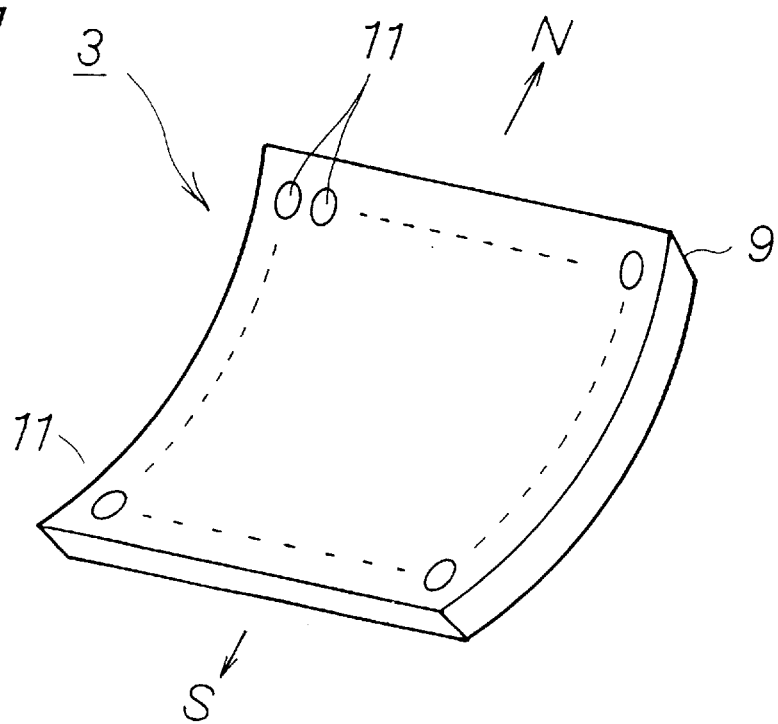
FIG. 27 is a perspective view showing a light collection section wherein a plurality of lens elements are arranged vertically across a curved surface which indents inward.

The lens elements are not necessarily restricted to the arrangements of the embodiments described above, and the light gathering ability can be increased by using the following structures. 1) While the plurality of lens elements 11 in the case are arranged on the same plane in the above embodiments, but depending upon the shape of the case 89, the plurality of lens elements 11 can be arranged on a curved surface which bulges outward in a lateral direction on the case 89 as shown in FIG. 24, or the plurality of lens elements 11 can be arranged on a curved surface which is indented inwardly as shown in FIG. 25. In FIGS. 24 and 25, the symbols N and S respectively indicate the directions north and south when installing the light collection section 83. Additionally, the plurality of lens elements 11 can be arranged on a curved surface which bulges outwardly in a vertical direction on the case 89 as shown in FIG. 26, the plurality of lens elements 11 can be arranged on a curved surface which is indented inwardly as shown in FIG. 27, or they can be arranged on a curved surface which bulges or indents in a vertical and lateral direction by combining the direction of curvature vertically and laterally. The rear portion of the lens element 11 can be supported by the support panel 15 or the like when the lens elements are arranged on a curved surface as mentioned above.

According to the structural arrangement of the lens elements 11 as explained above, if they are arranged on a curved surface which bulges or indents laterally, then as much sunlight as possible is able to be gathered even when the angle of the sun is low to the east or west directions.

If they are arranged on a curved surface which bulges or indents vertically, then as much sunlight as possible is able to be gathered even when the angle of the sun is low in wintertime. By arranging the lens elements 11 on a cylindrical surface, the sunlight gathering capability is able to be increased without a conventional tracking device, even if the sun in an eastern or western direction, or the sun during wintertime, is at a low angle.

Figure 28:
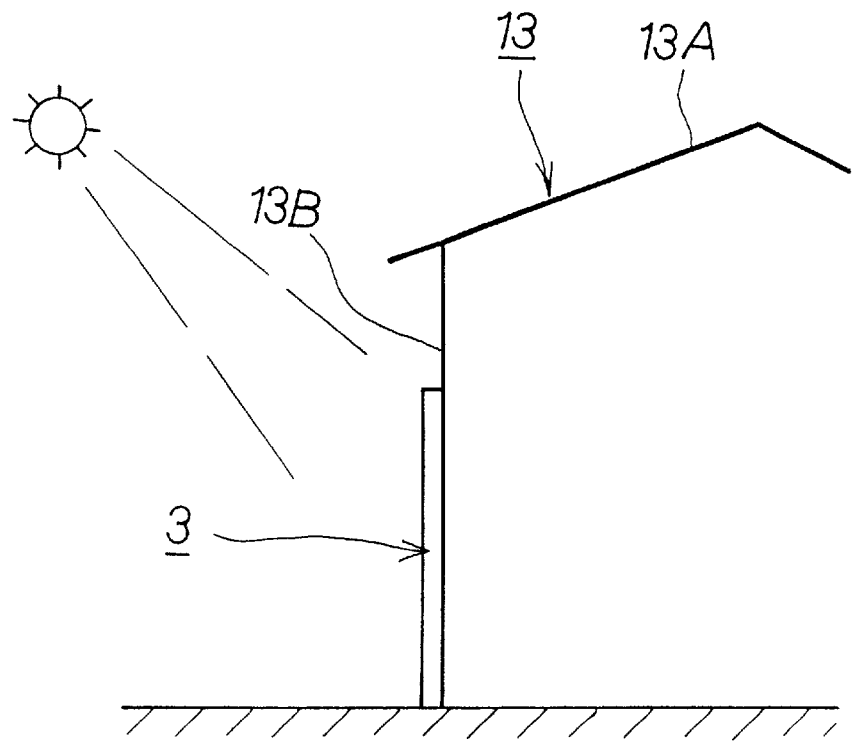
FIG. 28 is a side view showing a light collection section installed on a side wall of a building which receives sunlight.
Figure 29:
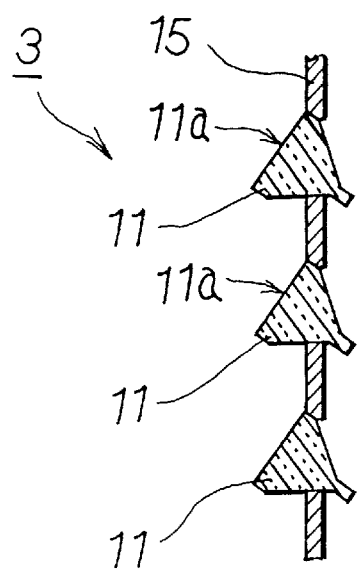
FIG. 29 is an enlarged section view showing a state of attachment of a lens element.

2) While the above embodiments explain cases wherein the light collection sections 3 are installed on the roof of a building or hung from a pole, the structure is not necessarily restricted to such, and the light collection sections 3 can be attached to the side wall 13B of a well-lit building 13 as shown in FIG. 28, and may be built into the side wall 13B during the construction of the building 13. In this case, the light collection capability of the lens elements 11' can be increased by orienting the front surfaces 11a' of the lens elements 11' to face in a diagonal upward direction as shown in FIG. 29.

Figure 30:
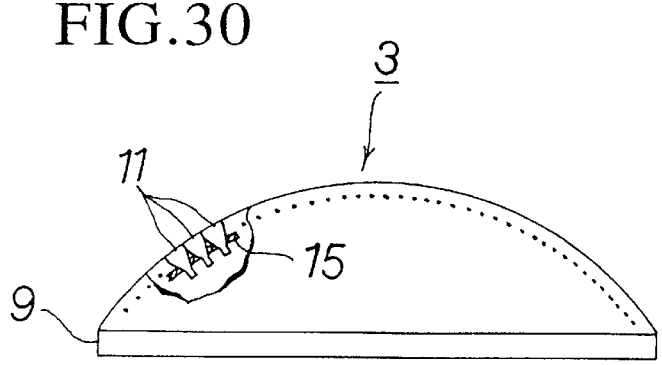
FIG. 30 is a side view showing a seventh embodiment of a light collection section according to the present invention, showing a light collection section wherein a plurality of lens elements are arranged in a dome shape.
Figure 31:
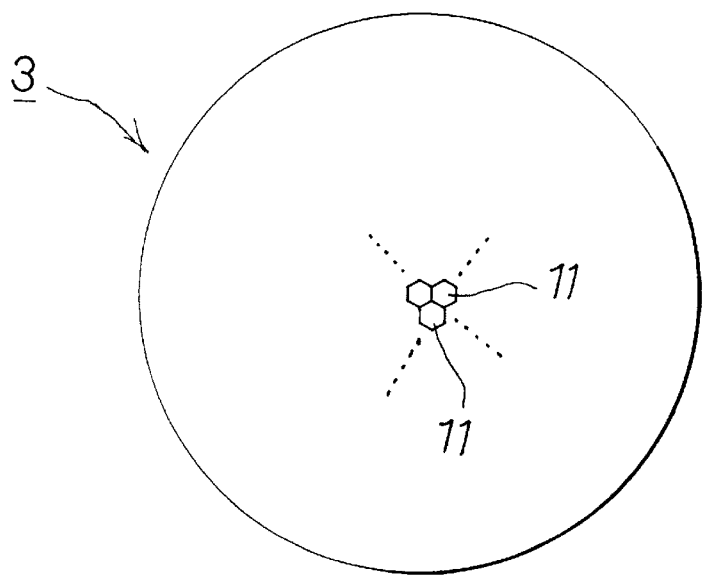
FIG. 31 is a plan view of a dome-shaped light collection section.
Figure 32:
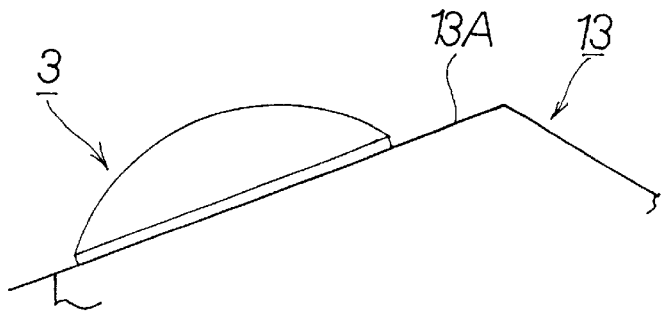
FIG. 32 is a side view showing a dome-shaped light collection section installed on the rooftop of a building.
Figure 33:
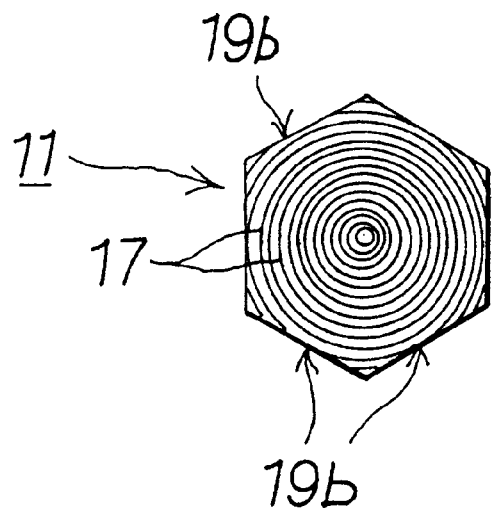
FIG. 33 is a plan view showing a lens element having a hexagonal planar shape.
Figure 34:
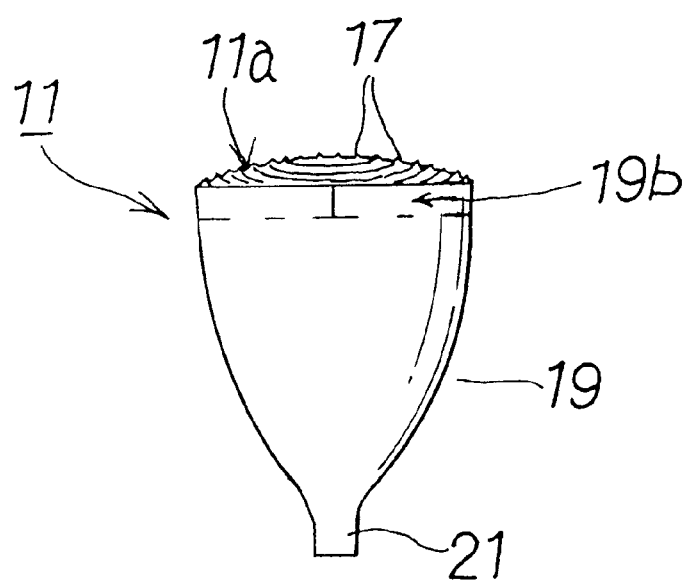
FIG. 34 is a side view showing a lens element having a hexagonal planar shape.

The seventh embodiment of the light collection section according to the present invention will be explained with reference to the drawings. FIG. 30 is a side view showing a seventh embodiment of a light collection section according to the present invention, showing a light collection section wherein a plurality of lens elements are arranged in a dome shape. FIG. 31 is a plan view of a dome-shaped light collection section. FIG. 32 is a side view showing a dome-shaped light collection section installed on the rooftop of a building. FIG. 33 is a plan view showing a lens element having a hexagonal planar shape. FIG. 34 is a side view showing a lens element having a hexagonal planar shape. As shown in FIGS. 30 and 31, the light collection section 93 of the present embodiment are formed in a dome shape with the plurality of lens elements 911 arranged on a spherical surface which bulges outwardly. The light collection section 93 may, for example, be installed on a well-lit roof 13A of a building 13 as shown in FIG. 32. As shown in FIGS. 33 and 34, each lens element 911 is formed into a planar hexagonal shape, with flat contact surface portions 919b which incline at a designated angle in a rearward direction formed on each side of the hexagon around the front portion of the guide portion 919 of the lens element 911. The contact surface portions 919b of the adjacent lens elements 911 contact these contact surface portions 919b so as to form a structure wherein the plurality of lens elements 911 are arranged in a spherical honeycomb. The inclination angles of the contact surface portions 919b of the lens elements 911 are set such that the optical axis of each lens element 911 passes through the center of the spherical surface; that is, the front surface 911a of each lens element 11 is oriented in the radial direction. As shown in FIG. 30, the lens elements 911 arranged on the spherical surface are supported by means of a spherical support panel 15 provided inside the plurality of arranged lens elements. in the present embodiment, each lens element 911 has a convex front surface 911a, and Fresnel rings 917 are formed on the front surface 911a. Consequently, the present embodiment allows sunlight to be collected by a plurality of lens elements facing in the radial direction, without having to track the sun, when the dome-shaped light collection section is installed on a southward roof of a building. As a result, sunlight is able to be reliably gathered without being significantly influenced by the height of the sun depending on the seasons or the inclination angle of the sun during a single day.

While the first, second and seventh embodiments have been explained with structures having the light collection section 3 on the roof 13A, the light collection section 3 may be built into the roof 13A, or the entire roof 13A may be filled by the light collection section 3.

Figure 35:
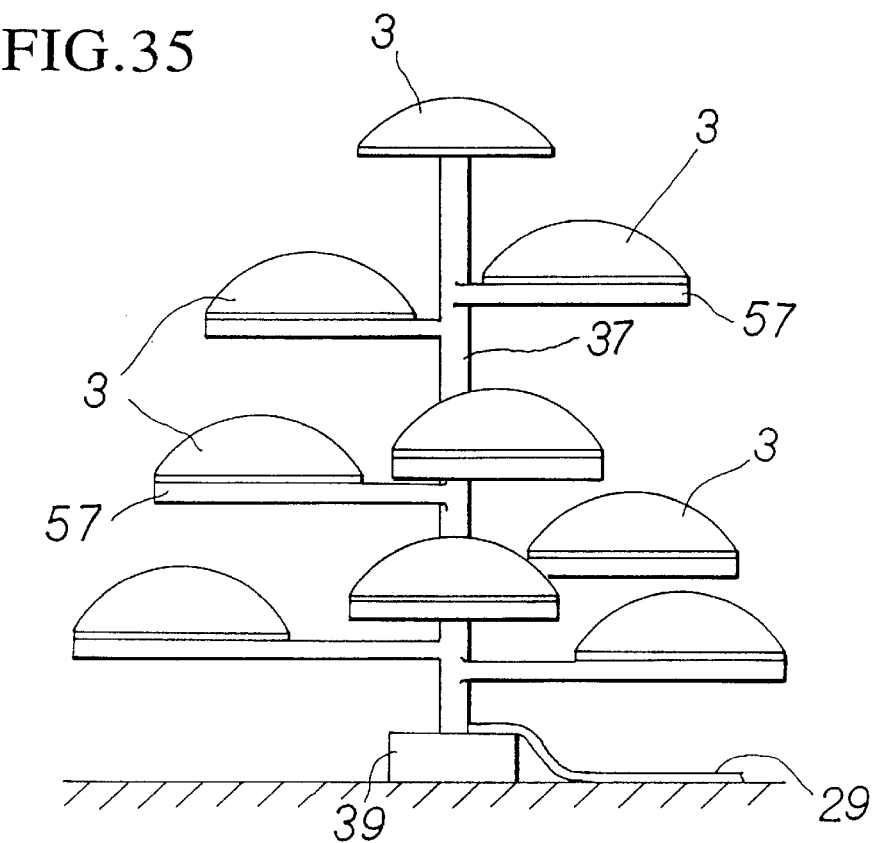
FIG. 35 is a front view showing an eighth embodiment of a light collection section according to the present invention, showing a tree-type light collection section wherein a plurality of dome-shaped light collection sections are arranged into a tree form.

The eighth embodiment of the light collection section according to the present invention will be explained with reference to the drawings. FIG. 35 is a front view showing a tree-shaped light collection section having a plurality of dome-shaped light collection sections arranged in a tree fashion. As shown in FIG. 35, the light collection section 93 of the present embodiment uses dome-shaped light collection sections 93 identical to those of the seventh embodiment, and has a structure which allows installation not on the roof 13A of a building 13, but in any well-lit area such as a yard, as with the third embodiment. That is, the present embodiment has a plurality of dome-shaped light collection sections 93 having somewhat smaller diameters than the light collection sections 93 of the seventh embodiment, these dome-shaped light collection sections 93 being supported on a pole (support pole) so as to form a tree-shaped light collection section 93. The light collection sections 93 become larger going from the upper portion to the lower portion of the pole 37, so as to collect as much sunlight as possible. Consequently, sunlight is able to be reliably gathered without being significantly influenced by the height of the sun depending on the seasons or the inclination angle of the sun during a single day as with the seventh embodiment, and the installation of the light collection section is made easier.

Figure 36:
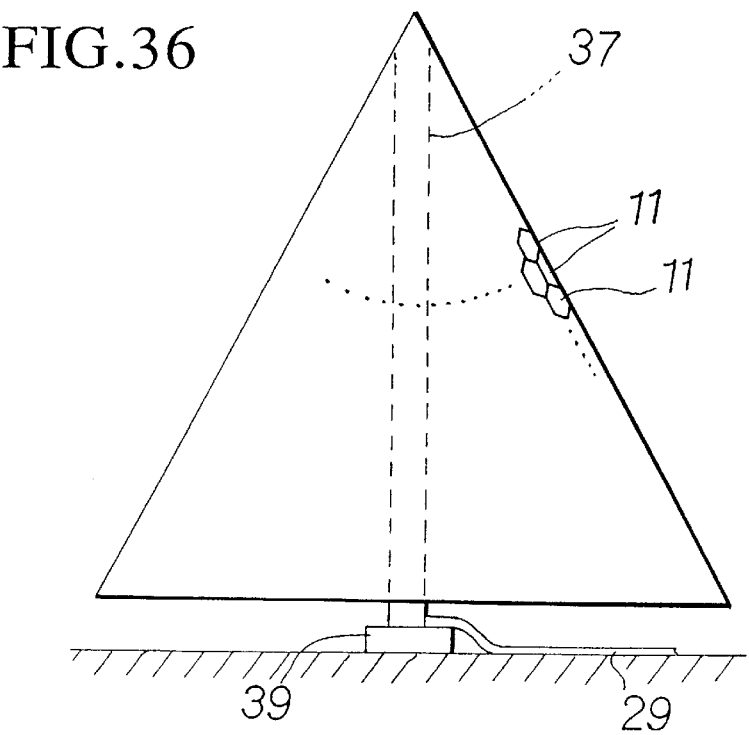
FIG. 36 is a front view showing a ninth embodiment of a light collection section according to the present invention, showing a tree-type light collection section wherein a plurality of hexagonal light collection sections are arranged into a tree form.

The ninth embodiment of the light collection section according to the present invention will be explained with reference to the drawings. FIG. 36 is a front view showing a tree-shaped light collection section having a plurality of hexagonal lens elements arranged in a cone shape. The light collection section 3 of the present embodiment uses a plurality of lens elements with a hexagonal planar shape as shown in FIGS. 33 and 34, with a structure arranged in a tree-fashion as shown in FIG. 36. That is, a plurality of lens elements 911 are arranged in a conical shape with a circumferential surface which tapers in an upward direction on a pole which is implanted in a yard or the like, the lens elements being supported from the inside by means of a support panel 15. The shape of the arrangement of lens elements 911 is not necessarily restricted to a conical shape, and the plurality of lens elements 911 may be arranged so as to form a polygonal pyramid shape. As a result, the present embodiment allows the same effects as the eighth embodiment to be obtained.

Figure 37:
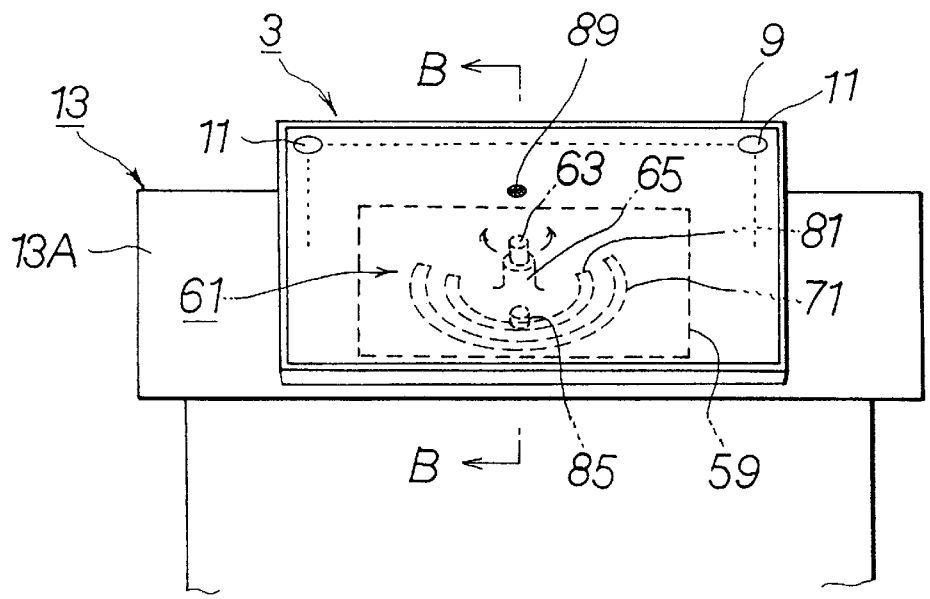
FIG. 37 is a front view of a light collection section having a solar tracking device.
Figure 38:
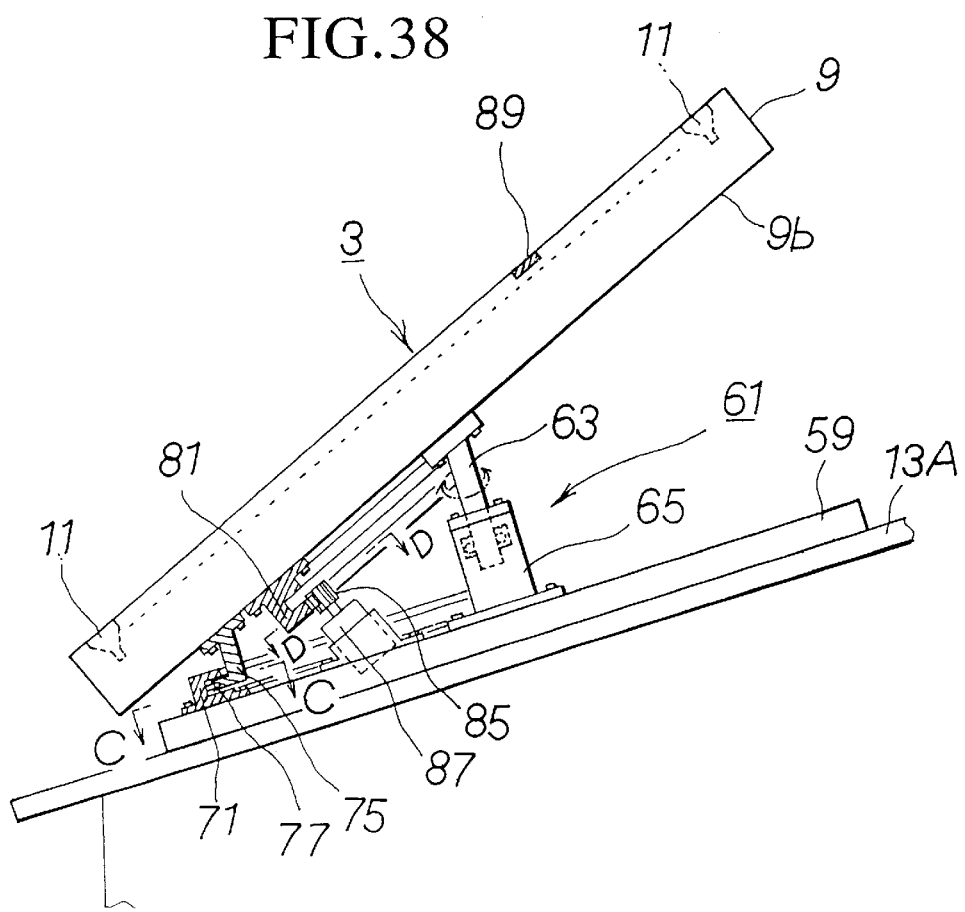
FIG. 38 is a section view along the line 38—38 in FIG. 37 showing a light collection section having a solar tracking device.
Figure 39:
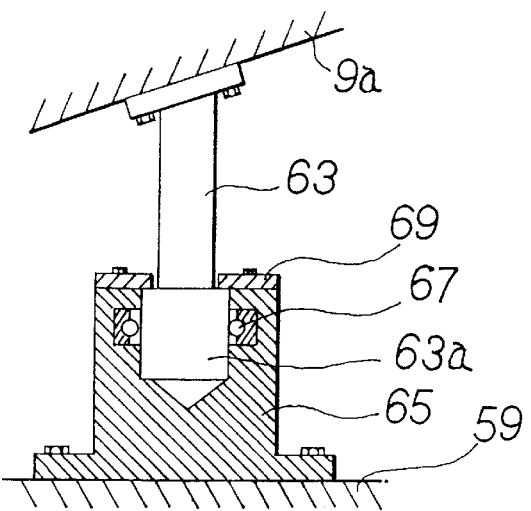
FIG. 39 is an enlarged section view showing a rotational axle and an axle support section.
Figure 40:
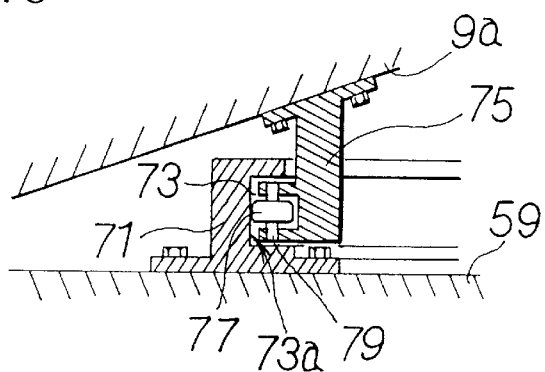
FIG. 40 is an enlarged section view showing a guide and a guide roller.
Figure 41:
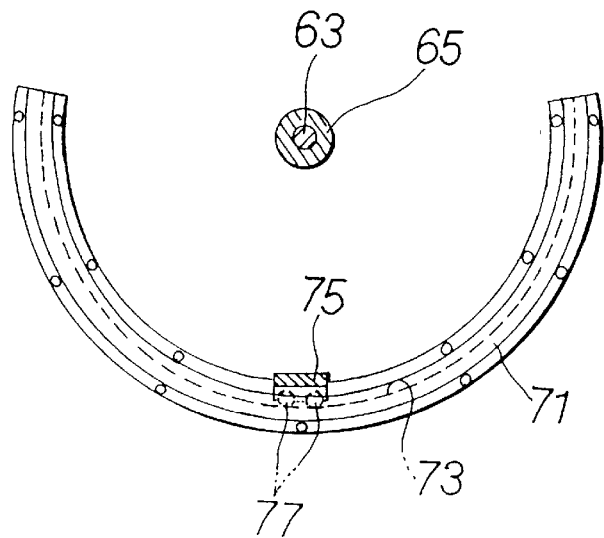
FIG. 41 is a section view along the line 41—41 in FIG. 38 showing a guide and a guide roller.
Figure 42:
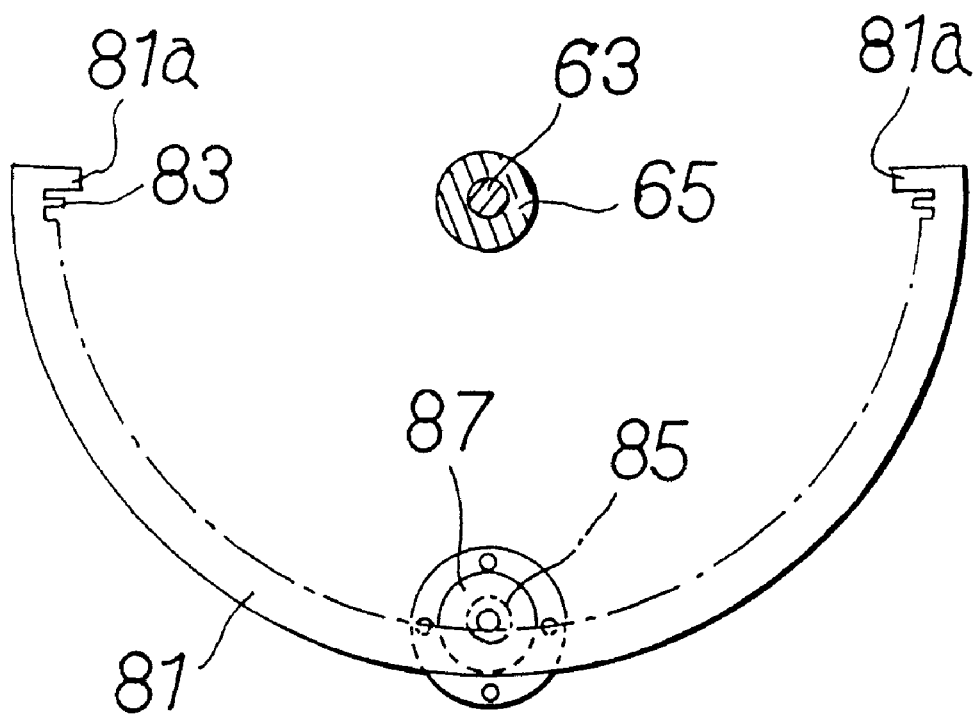
FIG. 42 is a section view along the line 42—42 in FIG. 38 showing a ring-shaped rack and a pinion provided on a motor.

The tenth embodiment of the light collection section according to the present invention will be explained with reference to the drawings. FIG. 38 is a section view along the line 38—38 in FIG. 37 showing a light collection section having a solar tracking device. FIG. 39 is an enlarged section view showing a rotary shaft and a shaft support portion. FIG. 40 is an enlarged section view showing a guide and a guide roller. FIG. 41 is a section view along the line 41—41 in FIG. 38 showing a guide and a guide roller. FIG. 42 is a section view along the line 42—42 in FIG. 38 showing a ring-shaped rack and a pinion provided on a motor. In the present embodiment, a light collection section 3 according to the first and second embodiments is further provided with a structure allowing the tracking of the sun. That is, as shown in FIGS. 37 and 38, a base 59 is installed on the roof 13A of a building 13, a light collection section 3 is rotatably provided on this base 59, and the light collection section 3 is rotationally driven by means of a solar tracking device 61. As shown in FIG. 39, a rotary shaft 63 protrudes at a designated angle of inclination from the approximate center of the bottom panel 9a of the case, and a shaft support portion 65 for supporting the rotary shaft 63 is attached at a right angle to the top surface of the base 59 at the approximate center of the base 59. The angle of inclination of the rotary axis 63 protruding from the light collection section 3 is determined by the inclination of the roof 13 and the height of the sun. The bottom end portion of the rotary shaft 63 has a large diameter, this large diameter portion 63a is inserted into the shaft support portion 65, and the large diameter portion 63a is rotatably supported by a bearing 67 provided in the shaft support portion 65. A lid portion 69 which engages with the top end surface of the large diameter portion 63a is affixed to the top surface of the shaft support portion 65 by means of bolts or the like, whereby the rotary shaft 63 is prevented from coming loose.

As shown in FIGS. 37 and 38, a ring-shaped guide 71 is affixed to the top surface of the base 59. This guide 71 is formed into a semi-circle centered at the shaft support portion 65, having a length which is somewhat longer than 180° in a circumferential direction centered on the shaft support section 65, as shown in FIG. 41. A guide groove 73 with an approximately C-shaped cross-section is formed in the guide 71 as shown in FIG. 40. An engaging arm 75 which intersects the base 59 protrudes from the bottom surface 9a of the case of the light collection section 3, and a guide roller 77 is rotatably supported at the tip of the engaging arm 75. The rotational axle 79 of the guide roller 77 is oriented so as to orthogonally intersect the top surface of the base 59, and is attached to the tip portion of the engaging arm 75 so as to contact the guide surface 73a which is the front surface inside the guide groove 73. As shown in FIG. 41, this engaging arm 75 is provided at a lower central portion of the front surface of the light collection portion 3, and may, for example, have two guide rollers 77. When the light collection section 3 rotates while centered on the rotary shaft 63, the guide roller 77 moves along the guide surface 73a of the guide groove 73. The upper and lower surfaces of the guide groove 73 function as guides so that the top end and the bottom end of the guide roller 77 do not come free from the guide groove 73.

A semi-circular rack 82 is affixed to the bottom panel 9a of the case of the light collection section 3. This rack 81 is formed into-an approximate semi-circle centered on the rotary shaft 63, and has teeth 83 formed on the inner circumference. As shown in FIG. 42, this rack 81 has a length somewhat longer than 180° in a circumferential direction centered on the rotational axle 63, and is provided with stopper portions 81*a* at both ends. On the other hand, the top surface of the base 59 is affixed with a motor 87 attached with a pinion which engages the rack 81. The rotational axle of the motor 87 is affixed to the base 59 so as to orthogonally intersect the bottom panel 9*a* of the case of the light collection section 3, a pinion 85 is affixed to this rotational axle, and the motor 87 is connected to a control section (not shown in the drawings). The structure is such as to allow the light collection section 3 to rotate about the rotary shaft 63 by rotating the motor 87 based on controls from the control section. In this case, the light collection section 3 is able to be rotated smoothly because the guide rollers 77 are guided by the guide groove 73. An optical sensor 89 is provided at the approximate center of the light collection section 3, and this optical sensor 89 is connected to the control section. The approximate position of the sun is detected by means of the optical sensor 89, and the control section controls the rotational drive of the motor 87 based on the detection signals from the optical sensor 89. Therefore, the light collection section 3 is rotated in correspondence with the movement of the sun over a single day, so that the light collection section 3 is able to collect light while tracking the sun. A timer is provided in the control section, so that when the time is 6:00 PM, for example, the motor 87 is rotated in reverse so as to move the light collection section 3 from a westward-facing orientation through the southside to lock onto an eastward-facing orientation in order to reset the apparatus for the following day. The tracking device 61 comprises a rotary shaft 63, a shaft support section 65, a guide 71, an engaging arm 75, a guide roller 77, a rack 81, a motor 87, a pinion 85, an optical sensor 89, a timer and a control section.

Consequently, the present embodiment allows the light gathering capability to be increased in comparison to the light collection section which gathers light while affixed to the roof, since the light collection section is always oriented in the direction of the sun. When tracking the sun, sunlight is able to be reliably gathered even if the sun is not aligned with the optical axis of the lens elements, so that light is able to be reliably gathered even with rough solar tracking, thereby allowing the tracking device to be made simpler and making the apparatus as a whole cheaper.

While the above-mentioned embodiments were primarily explained in cases wherein the apparatus is used in a residential building, they are not necessarily restricted to such and may be applied to other buildings, such as office buildings, or may be applied to plant cultivation.

I claim:

1. A sunlight collection apparatus, comprising:
    a light collection portion for collecting sunlight;
    a light conducting portion comprising optical fiber cables for conducting sunlight collected by said light collection portion, and
    a light scattering portion provided at an end of said light conducting portion, for emitting sunlight conducted by said light conducting portion;
    wherein said light collection portion comprises a plurality of lens elements, a front surface of each lens element being curved, each lens element having an approximately conical portion being tapered from said front surface toward a rearward direction, a guide portion for guiding sunlight entering each lens element being integrally formed with said lens element, said guide portion and said lens element being solid and unitarily formed, the circumferential inner surface of said guide portion being a mirror surface, and an optical fiber cable of said light conducting portion being coupled to said guide portion.

2. A sunlight collection apparatus according to claim 1, wherein the front surface of each of said lens elements is convex.

3. A sunlight collection apparatus according to claim 1, wherein the front surface of each of said lens elements is concave.

4. A sunlight collection apparatus according to claim 1, wherein the front surface of each of said lens elements is in the shape of a spherical section.

5. A sunlight collection apparatus according to claim 1, wherein the front surface of each of said lens elements is in the shape of a cylindrical surface section.

6. A sunlight collection apparatus according to claim 1, wherein the front surface of each of said lens elements forms a Fresnel lens provided with Fresnel rings.

7. A sunlight collection apparatus according to claim 1, wherein a circumferential surface of said guide portion is convex.

8. A sunlight collection apparatus according to claim 1, wherein a plurality of polygonal convex surfaces are formed on the front surface of each of said lens elements, and Fresnel rings are provided on each of said convex surfaces.

9. A sunlight collection apparatus according to claim 1, wherein a horizontal cross-section of each of said lens elements is circular.

10. A sunlight collection apparatus according to claim 1, wherein a horizontal cross-section of each of said lens elements is polygonal.

11. A sunlight collection apparatus according to claim 1, wherein a horizontal cross-section of each of said lens elements is hexagonal.

12. A sunlight collection apparatus according to claim 1, wherein said plurality of lens elements are arranged on a curved surface which is curved with respect to the horizontal plane.

13. A sunlight collection apparatus according to claim 1, wherein said plurality of lens elements is arranged in housings to form a plurality of light collection portions, said light collection portions being arranged in a tree-form by being detachably hung on a support, the tree-form having said lens elements shaped in a form of leaves of a tree provided on said support.

14. A sunlight collection apparatus according to claim 1, wherein said plurality of lens elements are arranged on a conical surface which tapers toward the upper portion thereof.

15. A sunlight collection apparatus according to claim 1, wherein said plurality of lens elements are arranged on a convex spherical section surface so that said light collection portion is in the shape of a dome.

16. A sunlight collection apparatus according to claim 15, wherein a plurality of said light collection portions are supported by an implanted support pole.

17. A sunlight collection apparatus according to claim 1, wherein said lens elements are arranged inside a housing being provided with a water path for running water from a bottom row of lens elements to a top row of lens elements, and being connected to a cold water pipe for introducing water to said water path at said bottom row and a hot water pipe for allowing hot water to flow from said water path at said top row.

18. A sunlight collection apparatus according to claim 17, wherein said water path is formed around said lens elements in order to allow water to absorb solar heat.

19. A sunlight collection apparatus according to claim 1, wherein said light collection portion, having said plurality of lens elements arranged flatly or on a curved surface, is provided with a tracking device which rotates said light collection portion in order to follow the path of the sun.

20. A sunlight collection apparatus according to claim 1, wherein a diameter of a rear end of said guide portion is equal to a diameter of said optical fiber cable.

21. A sunlight collection apparatus, comprising:

a light collector for collecting sunlight;

a light conductor, comprising optical fibers, for conducting sunlight collected by said light collector, and a light scatterer, provided at an end of said light conductor;

wherein said light collector comprises a plurality of lens elements, each lens element being tapered from a front surface toward a rearward direction, a conical guide portion for guiding sunlight entering each lens element being integrally formed with said lens element, said guide portion being unitarily formed of transparent material, a circumferential inner surface of said guide portion being a mirror surface, and an optical fiber cable of said light conductor being coupled to said guide portion.

* * * * *